US011210034B2

(12) United States Patent
Su

(10) Patent No.: US 11,210,034 B2
(45) Date of Patent: Dec. 28, 2021

(54) METHOD AND APPARATUS FOR PERFORMING HIGH AVAILABILITY MANAGEMENT OF ALL FLASH ARRAY SERVER

(71) Applicant: Silicon Motion, Inc., Hsinchu County (TW)

(72) Inventor: Zheng-Jia Su, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/031,831

(22) Filed: Sep. 24, 2020

(65) Prior Publication Data

US 2021/0271428 A1 Sep. 2, 2021

Related U.S. Application Data

(60) Provisional application No. 62/983,761, filed on Mar. 2, 2020.

(51) Int. Cl.
*G06F 3/06* (2006.01)
*G06F 11/30* (2006.01)

(52) U.S. Cl.
CPC ............ *G06F 3/0688* (2013.01); *G06F 3/061* (2013.01); *G06F 3/0653* (2013.01); *G06F 3/0656* (2013.01); *G06F 11/3051* (2013.01)

(58) Field of Classification Search
CPC ...... G06F 3/061; G06F 3/0653; G06F 3/0656; G06F 3/0688; G06F 11/3051
See application file for complete search history.

(56) References Cited

U.S. PATENT DOCUMENTS

2007/0055914 A1* 3/2007 Chandwani ......... G06F 11/0715 714/47.2
2014/0047159 A1* 2/2014 Ahwal .................. G06F 3/0644 711/103

(Continued)

FOREIGN PATENT DOCUMENTS

TW 201933080 A 8/2019

OTHER PUBLICATIONS

Y. T. Jin, S. Ahn and S. Lee, "Performance Analysis of NVMe SSD-Based All-flash Array Systems," 2018 IEEE International Symposium on Performance Analysis of Systems and Software (ISPASS), 2018, pp. 12-21, doi: 10.1109/ISPASS.2018.00010. (Year: 2018).*

*Primary Examiner* — Eric T Oberly
(74) *Attorney, Agent, or Firm* — Winston Hsu

(57) ABSTRACT

A method for performing high availability management of an all flash array (AFA) server and the AFA server operating according to the method are provided. The method may include: utilizing a monitor and poller module among multiple program modules running on any node of multiple nodes of the AFA server to monitor multiple types of resources of the AFA server, wherein the multiple program modules running on the any node comprise a hardware manager, and the hardware manager is configured to manage multiple hardware components in a hardware layer of the any node, to allow at least one portion of associated monitoring results regarding the multiple types of resources to be obtained through the hardware manager; and controlling the any node to select suitable candidate operation from multiple candidate operations respectively corresponding to the multiple monitored-information types according to at least one predetermined table to perform the suitable candidate operation.

11 Claims, 12 Drawing Sheets

(56) References Cited

U.S. PATENT DOCUMENTS

2018/0293123 A1* 10/2018 Kondapalli ......... G06F 11/0751
2019/0187909 A1 6/2019 Pinto

* cited by examiner

| Monitor | Failure Handling |
|---|---|
| UI/DB Service Status | (a) Warning |
| Data Port Link | (c) Failover |
| SMIStor Process | (c) Failover |
| SMIStor Data Mirroring Status | (d) Set Standalone |
| SMIStor FA Disk Status | (b) C2F |
| BMC SDR | (a) Warning |
| PSU Status | (b) C2F |

METHOD AND APPARATUS FOR PERFORMING HIGH AVAILABILITY MANAGEMENT OF ALL FLASH ARRAY SERVER

CROSS REFERENCE TO RELATED APPLICATIONS

This application claims the benefit of U.S. Provisional Application No. 62/983,761, which was filed on Mar. 2, 2020, and is included herein by reference.

BACKGROUND OF THE INVENTION

1. Field of the Invention

The present invention is related to memory control, and more particularly, to a method for performing high availability (HA) management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As Flash memories have been widely applied to various data storage device such as solid state drives (SSDs), etc., it is proposed in the related art to implement the data storage server to be a Flash type data storage server using Flash memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method for performing high availability management of an all flash array (AFA) server, and associated apparatus (e.g. the AFA server, a control circuit thereof, etc.), in order to solve the above-mentioned problems.

It is another objective of the present invention to provide a method for performing high availability management of an AFA server, and associated apparatus (e.g. the AFA server, a control circuit thereof, etc.), in order to protect data in the AFA server and guarantee high availability thereof.

At least one embodiment of the present invention provides a method for performing high availability management of an AFA server, where the method may comprise: utilizing a monitor and poller module among multiple program modules running on any node of multiple nodes of the AFA server to monitor multiple types of resources of the AFA server, wherein the multiple program modules running on the any node comprise a hardware manager, and the hardware manager is configured to manage multiple hardware components in a hardware layer of the any node, to allow at least one portion of associated monitoring results regarding the multiple types of resources to be obtained through the hardware manager; checking whether any error occurs according to monitored information, wherein the monitored information comprises said associated monitoring results regarding the multiple types of resources; and in response to occurrence of the any error, in a situation where the monitored information has been classified into multiple monitored-information types, controlling the any node to select at least one suitable candidate operation from multiple candidate operations respectively corresponding to the multiple monitored-information types according to at least one predetermined table to perform the at least one suitable candidate operation; wherein the at least one portion of said associated monitoring results regarding the multiple types of resources comprises remote node information of a remote node, wherein the remote node represents another node differing from the any node among the multiple nodes.

At least one embodiment of the present invention provides an all flash array (AFA) server. The AFA server may comprise multiple nodes and a plurality of solid state drives (SSDs). More particularly, any node of the multiple nodes comprises: at least one processor, arranged to control operations of the any node under control of multiple program modules; and multiple hardware components in a hardware layer of the any node. The plurality of SSDs may comprise: a first SSD group corresponding to the any node; and a second SSD group corresponding to a remote node, wherein the remote node represents another node differing from the any node among the multiple nodes. For example, the any node utilizes a monitor and poller module among the multiple program modules running on the any node to monitor multiple types of resources of the AFA server, wherein the multiple program modules running on the any node comprise a hardware manager, and the hardware manager is configured to manage the multiple hardware components in the hardware layer of the any node, to allow at least one portion of associated monitoring results regarding the multiple types of resources to be obtained through the hardware manager; the any node checks whether any error occurs according to monitored information, wherein the monitored information comprises said associated monitoring results regarding the multiple types of resources; and in response to occurrence of the any error, in a situation where the monitored information has been classified into multiple monitored-information types, the any node selects at least one suitable candidate operation from multiple candidate operations respectively corresponding to the multiple monitored-information types according to at least one predetermined table to perform the at least one suitable candidate operation; wherein the at least one portion of said associated monitoring results regarding the multiple types of resources comprises remote node information of the remote node.

The present invention method and associated apparatus (e.g. the AFA server, a control circuit thereof, etc.) can enhance overall performance, and protect data according to multiple control schemes of the method, and more particularly, guarantee the high availability of the AFA server. In addition, the present invention method and associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
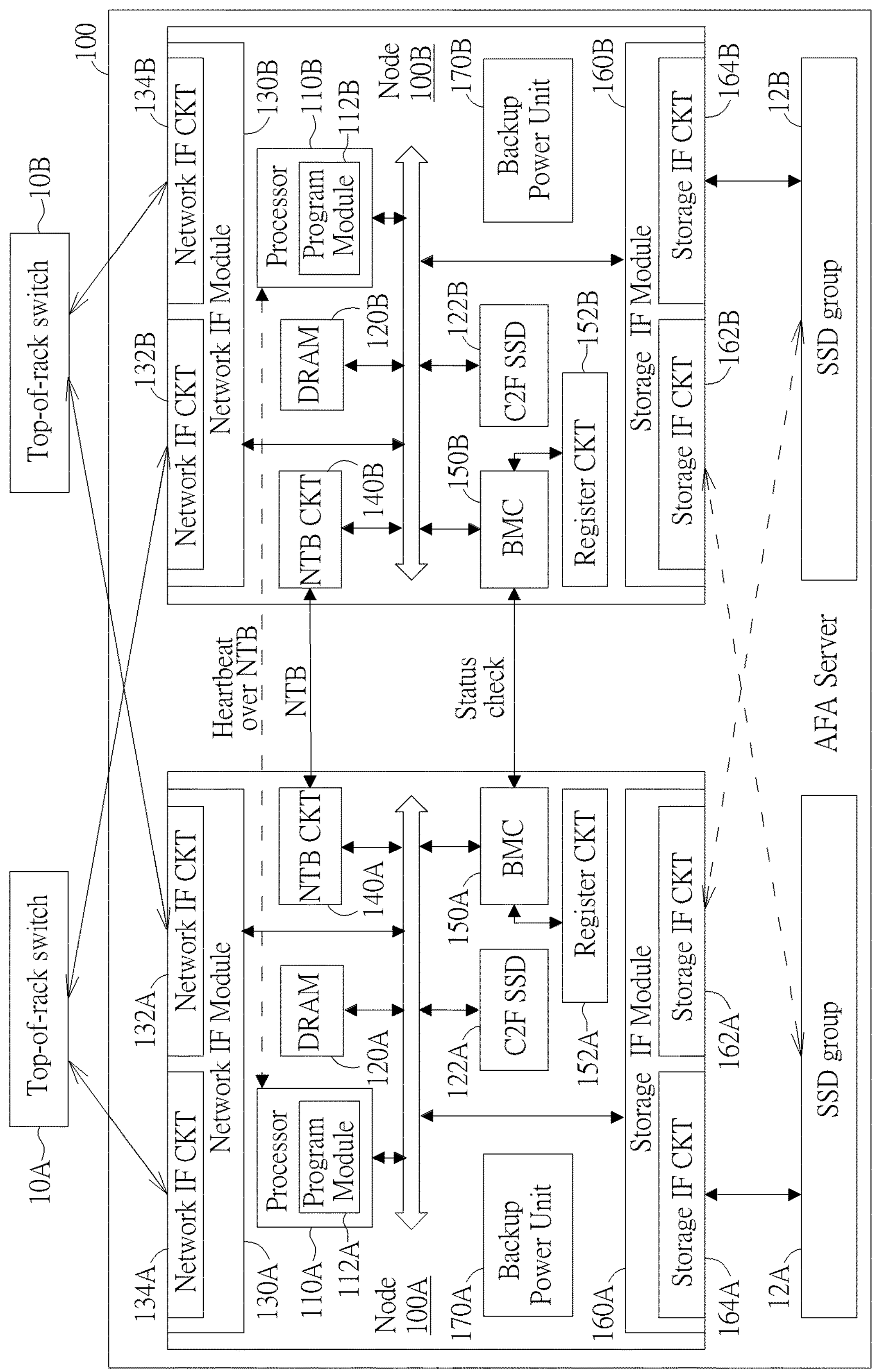
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
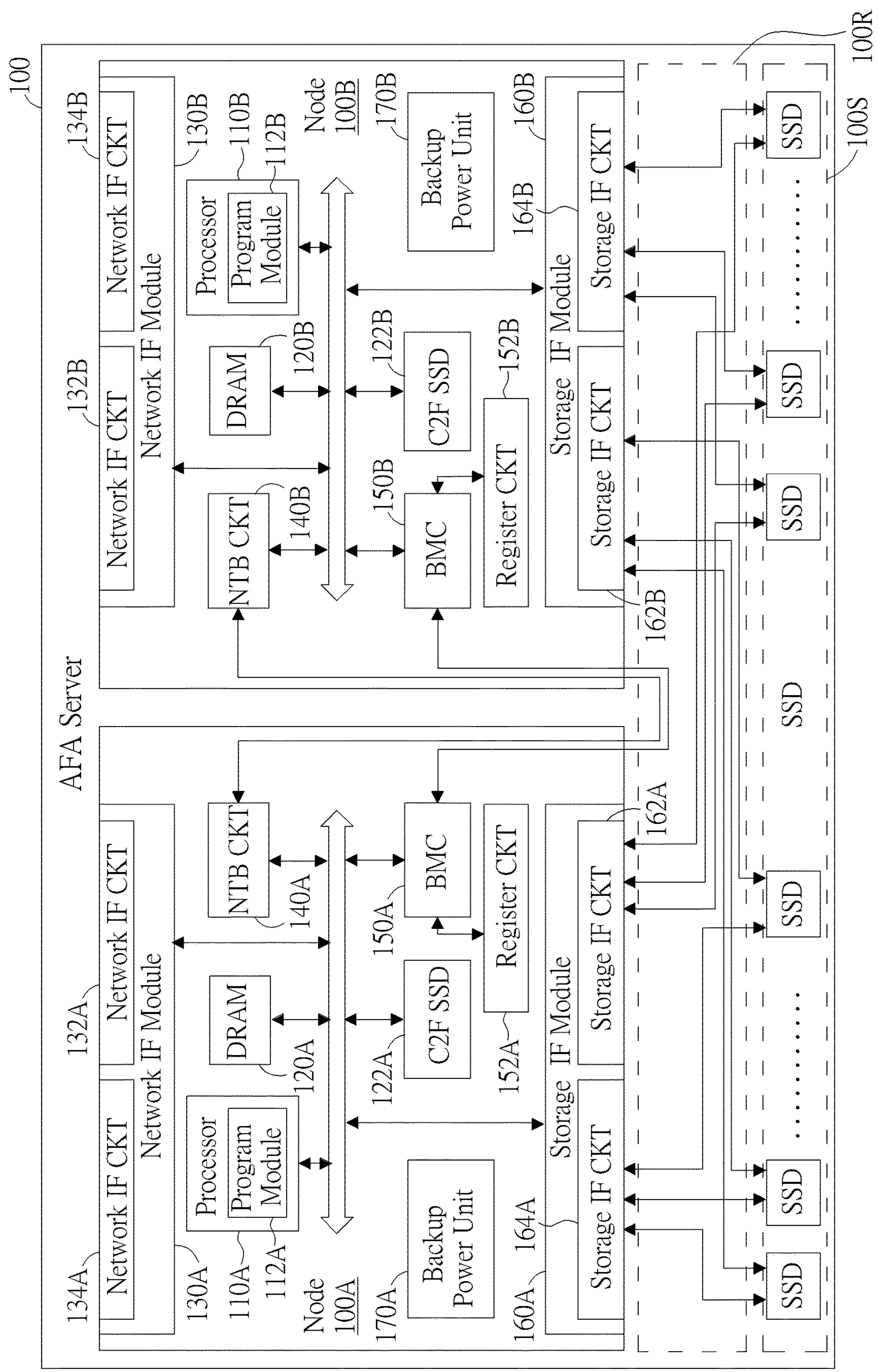
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
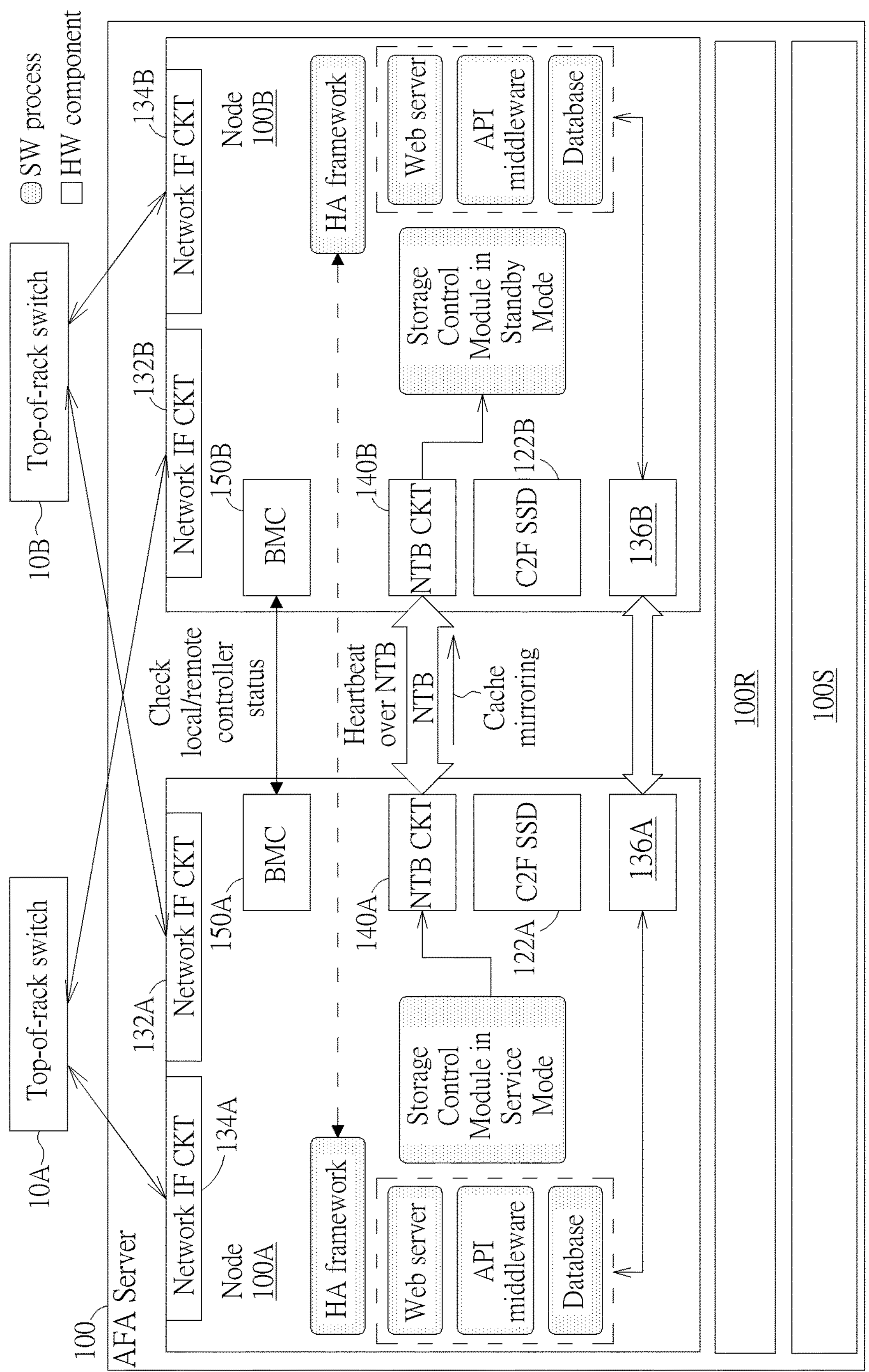
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
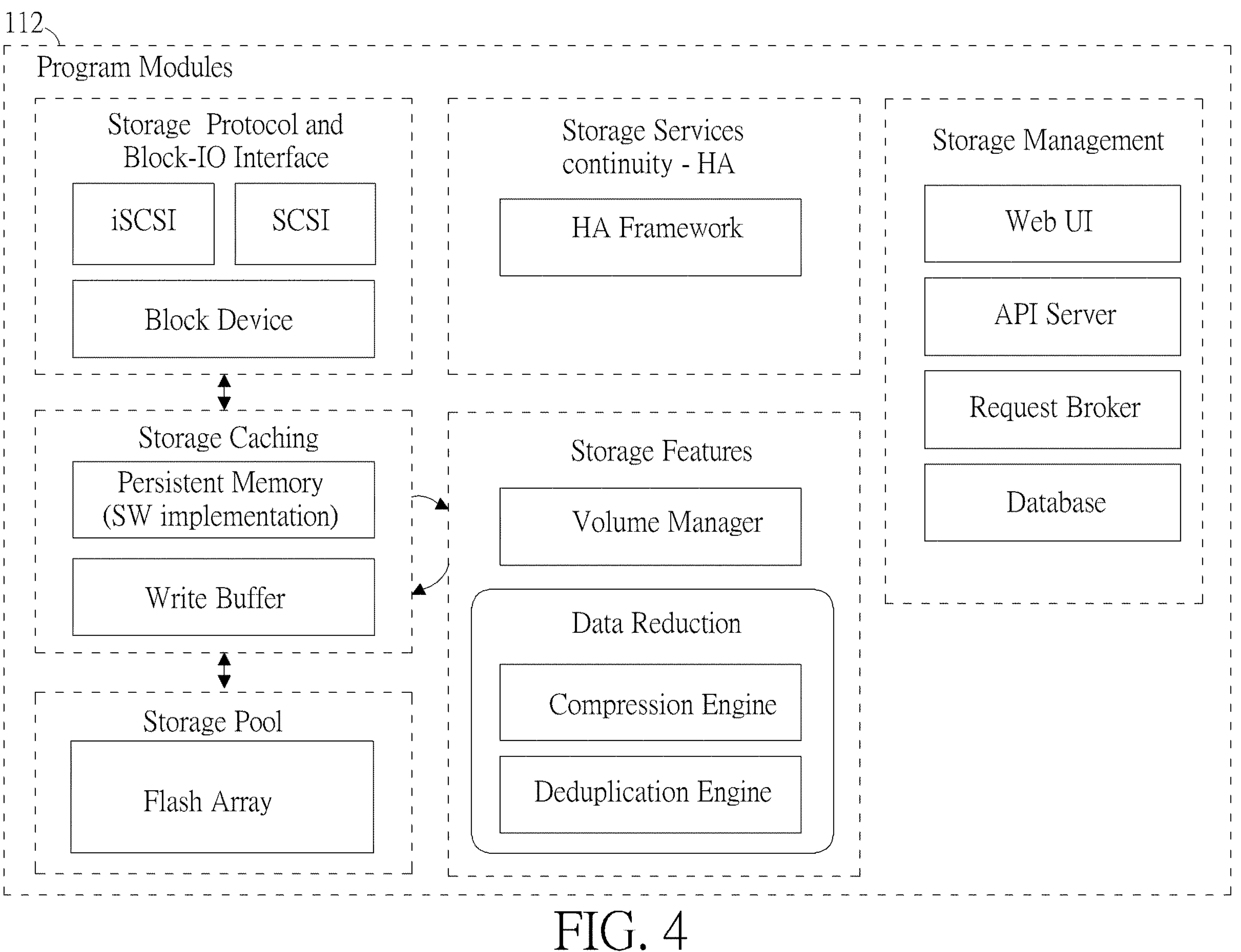
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-TO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework" for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UI) module, an Application Programming Interface (API) Server module, a Request Broker module and a Database module (respectively labeled "Web UI", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
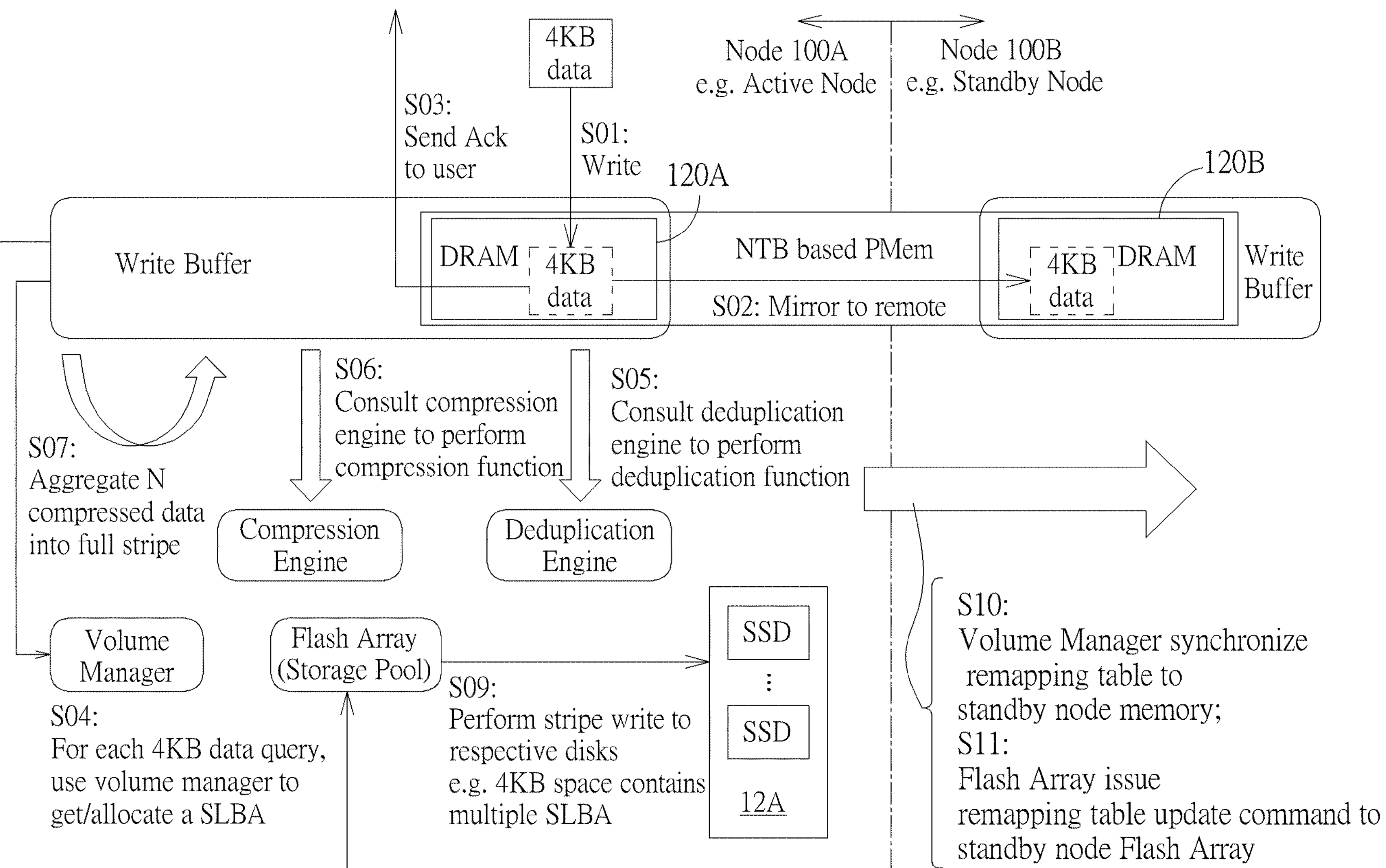
FIG. 5 illustrates a write control scheme of a method for performing high availability management of an AFA server such as that shown in FIG. 1 according to an embodiment of the present invention.

FIG. 5 illustrates a write control scheme of a method for performing high availability management of an AFA server such as that shown in FIG. 1 according to an embodiment of the present invention. The method can be applied to the AFA server 100 shown in FIG. 1. For better comprehension, the nodes 100A and 100B can play the role of the active node and the role of the standby node, respectively, but the present invention is not limited thereto. In response to the write request, the active node (e.g. one of the nodes 100A and 100B, such as the node 100A in this embodiment) can utilize the Write Buffer module to receive data (e.g. 4 kilobytes (KB) data, referred to as 4 KB data for brevity) corresponding to the write request and write (e.g. buffer) the data into the write buffer thereof (e.g. the DRAM of this node) in Step S01, mirror the data such as the 4 KB data to the standby node (e.g. another of the nodes 100A and 100B, such as the node 100B in this embodiment) through the NTB path in Step S02, and send an acknowledgement (Ack) corresponding to the write request to the client device of the user in Step S03. As the data has been mirrored to the remote side (e.g. the DRAM 120B in this embodiment), the mirrored data is protected by the standby node (e.g. the Write Buffer module thereof).

Regarding subsequent operations of the active node, in Step S04, for each 4 KB data query, the Write Buffer module can use the Volume Manager module to get or allocate a storage pool logical block address (SLBA) for the data. In Step S05, the Write Buffer module can consult the Deduplication Engine to perform a deduplication function on the data. In Step S06, the Write Buffer module can consult the Compression Engine to perform a compression function on the data. In Step S07, when a data amount of buffered data (e.g. the data to be written) in the DRAM (e.g. the DRAM 120A in this embodiment) reaches a predetermined threshold, for example, the active node has collected N sets of compressed data and the total data amount of the N sets of compressed data is suitable for being stored as a full stripe, the active node can utilize the Flash Array module to aggregate the N sets of compressed data (which can be referred to as N compressed data for brevity) into the full stripe. For example, the full stripe may represent a stripe comprising a predetermined number of chunks (e.g. twelve chunks), where these chunks may comprise a first predetermined number of data chunks (e.g. ten data chunks) and a second predetermined number of parity chunks (e.g. two parity chunks). In Step S08, after collecting one or more stripes such as a predetermined amount of stripes (e.g. any of one stripe, two stripes, three stripes, four stripes, etc., depending on various control schemes of the method), the active node can utilize the Write Buffer module to submit array information such as an array of SLBAs, an array of compressed data, etc. (e.g. the array of {Array of SLBAs, Array of compressed data}) to the Flash Array module (or the Storage Pool module), for writing the one or more stripes. In Step S09, the Flash Array module can perform stripe write to respective disks (e.g. the SSD group of the active node, such as the SSD group 12A in this embodiment). For example, as the Compression Engine has performed the compression function in Step S06, 4 KB space contains respective compressed data of multiple SLBA.

After performing the operations of Step S01-S09 as shown in FIG. 5, the active node can transmit associated management information to the standby node to update the management information in the standby node, in order to make the standby node be capable of replacing the active node to continue providing the storage service of the AFA server 100 for the users when there is a need. For example, in Step S10, the Volume Manager module of the active node can synchronize (e.g. update and transmit) a remapping table of the Volume Manager module to the standby node memory (e.g. the memory of the standby node), for controlling (e.g. generating, updating, etc.) some mapping relationships managed by the Volume Manager module. In Step S11, the Flash Array module of the active node can issue a remapping table update command to the standby node Flash Array (e.g. the Flash Array module of the standby node), to update a remapping table of the Flash Array module to the standby node memory (e.g. the memory of the standby node), for controlling (e.g. generating, updating, etc.) some mapping relationships managed by the Flash Array module. While the active node is capable of performing these operations in response to the write request as described above, the active node is capable of performing associated operations in response to the read request to recover the data, for example, according to the mapping relationships respectively managed by the Volume Manager module and the Flash Array module, where some implementation details regarding managing these mapping relationships will be described in some of the subsequent embodiments.

As shown in the upper half of FIG. 5, with the aid of software emulation, any node (e.g. each node) of the nodes 100A and 100B may comprise an emulated persistent memory (which may be referred to as PMem for brevity) based on another node of the multiple nodes, where the PMem can operate on the NTB path, and therefore can be regarded as the NTB based PMem. For example, the any node such as the node 100A can play the role of the active node and the other node such as the node 100B can play the role of the standby node. When a power failure of the main power source of the active node (e.g. the power failure of both of the respective main power sources of the nodes 100A and 100B) occurs, the active node can flush existing information (e.g. buffered data, management table, etc.) in the DRAM thereof into both of an internal non-volatile memory (NVM) storage device (e.g. the C2F SSD of the active node, such as the C2F SSD 122A in this embodiment) and the PMem. More particularly, as each of the nodes is equipped with its own internal NVM storage device(s) and PMem, the standby node can flush the existing information flushed from the active node (e.g. the buffered data, the management table, etc. flushed from the active node) in the DRAM thereof into an internal NVM storage device (e.g. the C2F SSD of the standby node, such as the C2F SSD 122B in this embodiment).

For the active node, although the DRAMs 120A and 120B in the NTB based PMem are volatile memories, the AFA server 100 can utilize the NTB based PMem as a persistent memory with the aid of software emulation, since the standby node that is operating under control of the Write Buffer module thereof can protect any existing information flushed from the active node. When the power failure occurs, the active node can flush the existing information in the DRAM thereof into the internal NVM storage device such as one of multiple NVM storage devices conforming to M.2 specification, and can flush the existing information in the DRAM thereof into the PMem by sending the existing information to the DRAM of the standby node through the NTB path. As a result, the standby node can flush the existing information in the DRAM thereof into the internal NVM storage device thereof (e.g. one of multiple NVM storage devices conforming to M.2 specification).

According to some embodiments, the nodes 100A and 100B can exchange the roles of the active node and the standby node, and can perform the respective operations of the nodes 100B and 100A as described above. For brevity, similar descriptions for these embodiments are not repeated in detail here.

According to some embodiments, in the high availability (HA) architecture implemented with the AFA server 100, the two nodes 100A and 100B such as the active node and the standby node may interact with each other to exchange the node information through the BMC path and the NTB path. More particularly, any node (e.g. each node) of the two nodes 100A and 100B may comprise one or more storage devices installed at the main circuit (e.g. the main circuit board having some hardware (HW) components thereon, as mentioned in the embodiment shown in FIG. 1 and some associated embodiments), such as one or more non-volatile memory (NVM) storage devices comprising NVM (e.g. Flash memory). In a situation where the NVM storage device count of the one or more NVM storage devices is greater than one, the one or more NVM storage devices may comprise multiple NVM storage devices such as that mentioned above. For example, the one or more NVM storage devices may conform to M.2 specification and may be implemented as one or more internally mounted expansion cards of this node, but the present invention is not limited thereto. In addition, when power failure occurs, one or more lower layers such as the SSDs in the AFA of the node may become unavailable, the main circuit of the node, as well as the HW components (e.g. the processor, the DRAM, the BMC, the registers, etc.) of this main circuit, may operate using power of the backup power source (e.g. the battery) of the main circuit, and the node (e.g. software modules running on the processor, such as the program modules 112A or 112B) may perform a C2F operation to save any information to be protected, such as buffered data, etc. temporarily stored in the DRAM of the node and the node information, etc. temporarily stored in the registers of the register circuit of the node, into the one or more NVM storage devices to prevent data loss. For example, the C2F SSD of the node may comprise the one or more NVM storage devices conforming to the M.2 specification.

Figure 6:
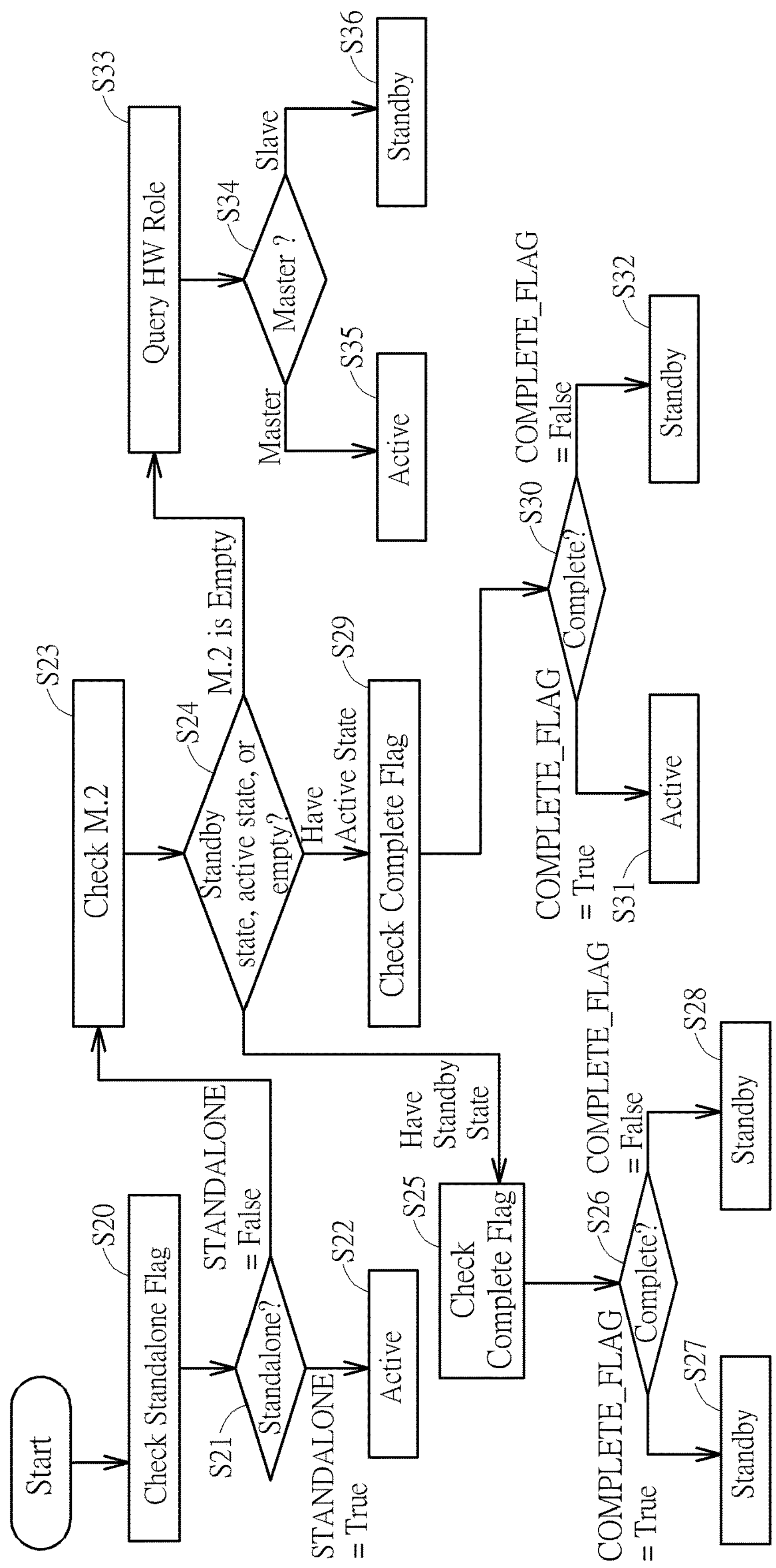
FIG. 6 illustrates a role determination control scheme of the method for performing high availability management of the AFA server according to an embodiment of the present invention.

FIG. 6 illustrates a role determination control scheme of the method for performing high availability management of the AFA server according to an embodiment of the present invention. Under control of the software layer (e.g. the software modules, such as the HA Framework module, etc.), the any node (e.g. each node) of the two nodes 100A and 100B can be configured to determine the role of the node according to the role determination control scheme. More particularly, the HA Framework module (e.g. the HA framework process) of the node can determine whether the role of the node is the active node or the standby node, but the present invention is not limited thereto. For example, the HA Framework module of the node can further control the service start and stop order, and monitor components status and, when any failure occurs, perform error handling, where operations of the error handling may comprise performing failover control, performing the C2F operation, and generating/outputting warning (e.g. one or more associated warning messages).

In Step S20, the node may check (e.g. read) a standalone flag STANDALONE to generate a checking result, where this checking result may indicate whether the node is in the standalone state.

In Step S21, the node may determine whether the node is in a standalone state according to the checking result of Step S20. If the node is in the standalone state (e.g. STANDALONE=True), Step S22 is entered; otherwise (e.g. STANDALONE=False), Step S23 is entered.

In Step S22, the node may determine that the role of the node is the active node (labeled "Active" for brevity).

In Step S23, the node may check at least one M.2 status regarding the one or more NVM storage devices conforming to the M.2 specification (labeled "Check M.2" for brevity) to generate at least one checking result (e.g. one or more checking results), where the aforementioned at least one checking result may indicate whether at least one M.2 slot (e.g. one or more M.2 mating connectors for installing the one or more NVM storage devices) is empty, and more particularly, for the case that the M.2 slot is not empty, indicate whether the one or more NVM storage devices have a standby state or an active state.

In Step S24, according to the aforementioned at least one checking result of Step S23, the node may determine whether the M.2 slot is empty (labeled "M.2 is Empty" for brevity), and more particularly, for the case that the M.2 slot is not empty, determine whether the one or more NVM storage devices have the standby state or the active state. If the M.2 slot is empty, Step S33 is entered; otherwise, if the one or more NVM storage devices have the active state, Step S29 is entered; otherwise (i.e. the one or more NVM storage devices have the standby state), Step S25 is entered.

In Step S25, the node may check (e.g. read) a complete flag COMPLETE_FLAG to generate a checking result, where this checking result may indicate whether the node has completed a C2F operation such as that mentioned in the previous embodiments.

In Step S26, the node may determine whether the node has completed the C2F operation according to the checking result of Step S25. If the node has completed the C2F operation (e.g. COMPLETE_FLAG=True), Step S27 is entered; otherwise (e.g. COMPLETE_FLAG=False), Step S28 is entered.

In Step S27, the node may determine that the role of the node is the standby node (labeled "Standby" for brevity).

In Step S28, the node may determine that the role of the node is the standby node (labeled "Standby" for brevity).

In Step S29, the node may check (e.g. read) the complete flag COMPLETE_FLAG to generate a checking result, where this checking result may indicate whether the node has completed a C2F operation such as that mentioned in the previous embodiments.

In Step S30, the node may determine whether the node has completed the C2F operation according to the checking result of Step S29. If the node has completed the C2F operation (e.g. COMPLETE_FLAG=True), Step S31 is entered; otherwise (e.g. COMPLETE_FLAG=False), Step S32 is entered.

In Step S31, the node may determine that the role of the node is the active node (labeled "Active" for brevity).

In Step S32, the node may determine that the role of the node is the standby node (labeled "Standby" for brevity).

In Step S33, the node may query a hardware (HW) role of the hardware layer of the node (labeled "Query HW Role" for brevity) to generate a checking result, where this checking result may indicate whether the node is a master node or a slave node. For better comprehension, assume that the two nodes 100A and 100B may have been defined as the master node and the slave node in advance, respectively, for example, through respective predetermined settings of the two nodes 100A and 100B, but the present invention is not limited thereto. As a result, when at least one predetermined condition (e.g. one or more predetermined conditions) is satisfied, the two nodes 100A and 100B may play the roles of the active node and the standby node by default, respectively.

In Step S34, the node may determine whether the node is the master node or the slave node according to the checking result of Step S33. If the node is the master node, Step S35 is entered; otherwise (e.g. the node is the slave node), Step S36 is entered.

In Step S35, the node may determine that the role of the node is the active node (labeled "Active" for brevity).

In Step S36, the node may determine that the role of the node is the standby node (labeled "Standby" for brevity).

For better comprehension, the method may be illustrated with the working flow shown in FIG. 6, but the present invention is not limited thereto. According to some embodiments, one or more steps may be added, deleted, or changed in the working flow shown in FIG. 6.

According to some embodiments, the BMC of the any node (e.g. each node) of the two nodes 100A and 100B may operate under control of the software layer (e.g. the software modules such as connector, HW/board manager, etc.), to access any of the registers (e.g. read or write node information) when there is a need. For example, role and status transitions may be illustrated with a transition diagram, where status may be synchronized through the BMC path, and the data and status may be synchronized through the NTB path. The node information may comprise monitored information (e.g. status), and the node may classify the monitored information into multiple types to perform operations corresponding to the multiple types (e.g. output warning for Type A, perform C2F operation for Type B, trigger failover for Type C, set standalone for Type D, etc.), respectively. For example, the monitored information (e.g. status) may comprise status detected via the sensors/detectors in the node (e.g. in the main circuit). For better comprehension, some terms such as UI, DB, SMIStor, PSU, Pmem, FA, and SDR may stand for User Interface (e.g. UI software/program module such as the Web UI module shown in the upper right of FIG. 4), Database (e.g. DB software/program module such as the Database module shown in the upper right of FIG. 4), AFA system (e.g. AFA software/program module such as the Storage Control Module of the corresponding node of the nodes 100A and 100B shown in FIG. 3), Power Supply Unit (e.g. the aforementioned at least one main power source of the embodiment shown in FIG. 1), Persistent memory (e.g. Pmem software/program module such as the Persistent Memory shown in the middle of the left-hand side of FIG. 4, the NTB based PMem shown in the upper half of FIG. 5, etc.), Flash Array (e.g. FA software/program module such as the Flash Array module shown in the lower left of FIG. 4), and Sensor Data Record (e.g. one or more records of sensor data obtained from the sensors/detectors in the node), respectively. For example, the DB may record user action information (e.g. historical information of user actions) to be used by the UI. In addition, some software components such as resources may comprise the HW manager, etc. In the actions of the resources, the action "demote" may release or give up the role of the active node, and the action "promote" may change the role of the node from standby (e.g. the standby node) to active (e.g. the active node).

Figure 7:
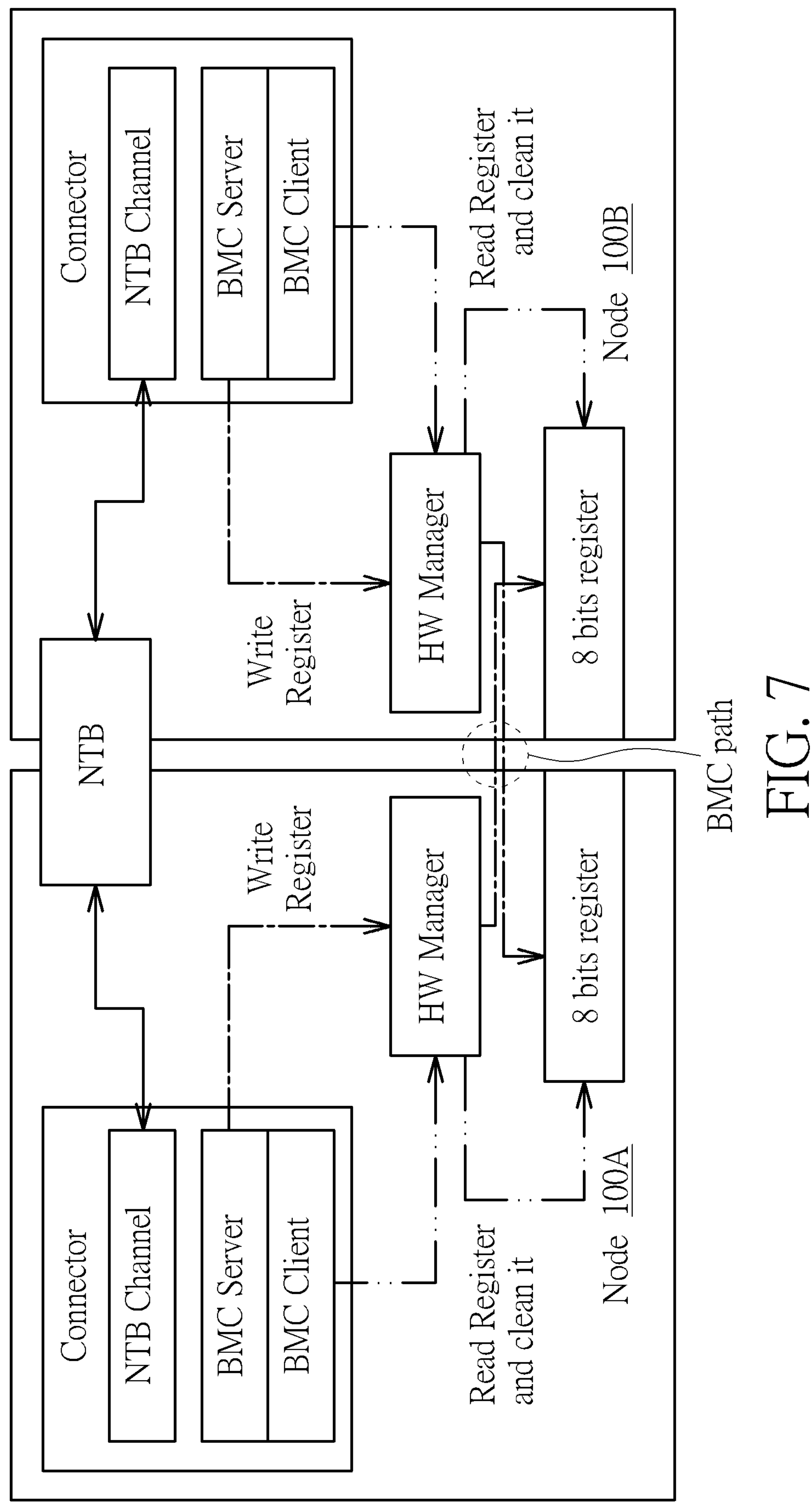
FIG. 7 illustrates a role information exchange control scheme of the method for performing high availability management of the AFA server according to an embodiment of the present invention.

FIG. 7 illustrates a role information exchange control scheme of the method for performing high availability management of the AFA server according to an embodiment of the present invention. Under control of the software layer (e.g. the software modules, such as the HA Framework module, etc.), the any node (e.g. each node) of the two nodes

100A and 100B can be configured to exchange the role information according to the role information exchange control scheme. For example, the two nodes 100A and 100B can exchange the role information through the aforementioned at least two communications paths such as the NTB path (labeled "NTB" in FIG. 1 and FIG. 7 for brevity) between the NTB communications circuits 140A and 140B shown in FIG. 1 and the BMC path between the BMCs 150A and 150B shown in FIG. 1, where some HW components such as the NTB communications circuits 140A and 140B and the BMCs 150A and 150B are not illustrated in FIG. 7 for brevity.

As shown in FIG. 7, the program modules 112A running on the processor 110A of the node 100A may comprise a Connector module (labeled "Connector" for brevity) for controlling a portion of operations regarding connections between the two nodes 100A and 100B, and the program modules 112B running on the processor 110B of the node 100B may comprise a Connector module (labeled "Connector" for brevity) for controlling another portion of operations regarding the connections between the two nodes 100A and 100B, where each of the respective Connector modules of the two nodes 100A and 100B may comprise multiple sub-modules such as a NTB Channel module, a BMC Server module and a BMC Client module (labeled "NTB Channel", "BMC Server" and "BMC Client" for brevity). For example, the Connector module of the node 100A may control the NTB communications circuit 140A to communicate with the NTB communications circuit 140B through the NTB path, and the Connector module of the node 100B may control the NTB communications circuit 140B to communicate with the NTB communications circuit 140A through the NTB path, as illustrated with some role information exchange paths corresponding to the NTB path (e.g. the role information exchange path between the NTB Channel module of the node 100A and the NTB path and the role information exchange path between the NTB Channel module of the node 100B and the NTB path. As a result, the two nodes 100A and 100B can be configured to exchange the role information (e.g. information indicating the role of the node 100A and information indicating the role of the node 100B) through the NTB path.

The program modules 112A running on the processor 110A of the node 100A may further comprise another program module such as the HW Manager module thereof (labeled "HW Manager" in the node 100A shown in FIG. 7 for brevity) for controlling some HW components such as the BMC 150A, the register circuit 152A, etc. in the node 100A, and the program modules 112B running on the processor 110B of the node 100B may further comprise another program module such as the HW Manager module thereof (labeled "HW Manager" in the node 100B shown in FIG. 7 for brevity) for controlling some HW components such as the BMC 150B, the register circuit 152B, etc. in the node 100B. For example, the BMC Server module of the node 100A may control the BMC 150A through the HW Manager module of the node 100A, to write at least one register (e.g. 8 bits register) of the register circuit 152B of the node 100B, as illustrated with some role information exchange paths regarding register writing (e.g. the role information exchange path between the BMC Server module and the HW Manager module of the node 100A and the role information exchange path between the HW Manager module of the node 100A and the 8 bits register of the node 100B). Similarly, the BMC Server module of the node 100B may control the BMC 150B through the HW Manager module of the node 100B, to write at least one register (e.g. 8 bits register) of the register circuit 152A of the node 100A, as illustrated with some role information exchange paths regarding register writing (e.g. the role information exchange path between the BMC Server module and the HW Manager module of the node 100B and the role information exchange path between the HW Manager module of the node 100B and the 8 bits register of the node 100A). In addition, the BMC Client module of the node 100A may control the BMC 150A through the HW Manager module of the node 100A, to read the aforementioned at least one register (e.g. the 8 bits register) of the register circuit 152A of the node 100A, and more particularly, clean it when there is a need, as illustrated with some role information exchange paths regarding register reading and cleaning (e.g. the role information exchange path between the BMC Client module and the HW Manager module of the node 100A and the role information exchange path between the HW Manager module and the 8 bits register of the node 100A). Similarly, the BMC Client module of the node 100B may control the BMC 150B through the HW Manager module of the node 100B, to read the aforementioned at least one register (e.g. the 8 bits register) of the register circuit 152B of the node 100B, and more particularly, clean it when there is a need, as illustrated with some role information exchange paths regarding register reading and cleaning (e.g. the role information exchange path between the BMC Client module and the HW Manager module of the node 100B and the role information exchange path between the HW Manager module and the 8 bits register of the node 100B).

When determining the role of the node 100A, the node 100A can send the information indicating the role of the node 100A to the node 100B through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100B of the role of the node 100A. Similarly, when determining the role of the node 100B, the node 100B can send the information indicating the role of the node 100B to the node 100A through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100A of the role of the node 100B. As a result, the two nodes 100A and 100B can be configured to exchange the role information (e.g. information indicating the role of the node 100A and information indicating the role of the node 100B) through the BMC path.

According to some embodiments, one of the two nodes 100A and the node 100B can be configured to determine the role of the other of the two nodes 100A and the node 100B. In this situation, when determining the role of the node 100B, the node 100A can send the information indicating the role of the node 100B to the node 100B through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100B of the role of the node 100B. Similarly, when determining the role of the node 100A, the node 100B can send the information indicating the role of the node 100A to the node 100A through any of the aforementioned at least two communications paths (e.g. the NTB path and the BMC path), for example by using the role information exchange paths corresponding to the NTB path and/or by using the corresponding role information exchange paths regarding register writing and the corresponding role information exchange paths regarding register reading and cleaning, to notify the node 100A of the role of the node 100A. As a result, the two nodes 100A and 100B can be configured to exchange the role information (e.g. information indicating the role of the node 100A and information indicating the role of the node 100B) through the BMC path.

According to some embodiments, if role conflict occurs, at least one of the two nodes 100A and 100B may utilize the UI to output one or more hints for guiding the user to set the respective roles of the two nodes 100A and 100B manually.

TABLE 1

| Active | | Standby | |
|---|---|---|---|
| Status | Description | Status | Description |
| Running | System is normal | Running | System is normal |
| Standalone | Only active node service | Out of Sync | Keep old data. Need to sync from active |
| Stop | Service stopping | Abnormal | Failure(s) occur. Cannot provide service |
| Demote | Failure(s) occur. Start to perform failover | Promote | Takeover service |
| C2F | Copy memory data into Flash (M.2) | C2F | Copy memory data into Flash (M.2) |

Table 1 illustrates some examples of role and status regarding any node of the two nodes 100A and 100B and associated descriptions, where Active and Standby may represent the role of the active node and the role of the standby node, respectively. When the node is playing the role of the active node, examples of the status of the node may include, but are not limited to: the Running status, in which the system of the active node is normal and is operating correctly; the Standalone status, in which only the active node service (i.e. the service of the active node) is available; the Stop status, in which the service of the active node is stopping; the Demote status, in which the active node starts to perform failover for releasing the role of the active node when failure(s) of the active node occur; and the C2F status, in which the active node is performing a C2F operation such as that mentioned above to copy memory data (e.g. the data in the DRAM of the active node) into the one or more NVM storage devices (e.g. Flash memory) conforming to the M.2 specification in the active node (labeled "Flash (M.2)" for better comprehension). When the node is playing the role of the standby node, examples of the status of the node may include, but are not limited to: the Running status, in which the system of the standby node is normal and is operating correctly; the Out of Sync status, in which the standby node merely keeps old data of the active node and needs to synchronize (sync) the latest data (e.g. the latest version of data) from the active node to make the data stored in the standby node be equivalent to the latest data stored in the active node; the Abnormal status, in which the standby node cannot provide any service (e.g. the service of synchronizing the latest data from the active node to the standby node) when failure(s) of the standby node occur; the Promote status, in which the standby node takes over the service for changing the role thereof; and the C2F status, in which the standby node is performing a C2F operation such as that mentioned above to copy memory data (e.g. the data in the DRAM of the standby node) into the one or more NVM storage devices (e.g. Flash memory) conforming to the M.2 specification in the standby node (labeled "Flash (M.2)" for better comprehension).

Figure 8:
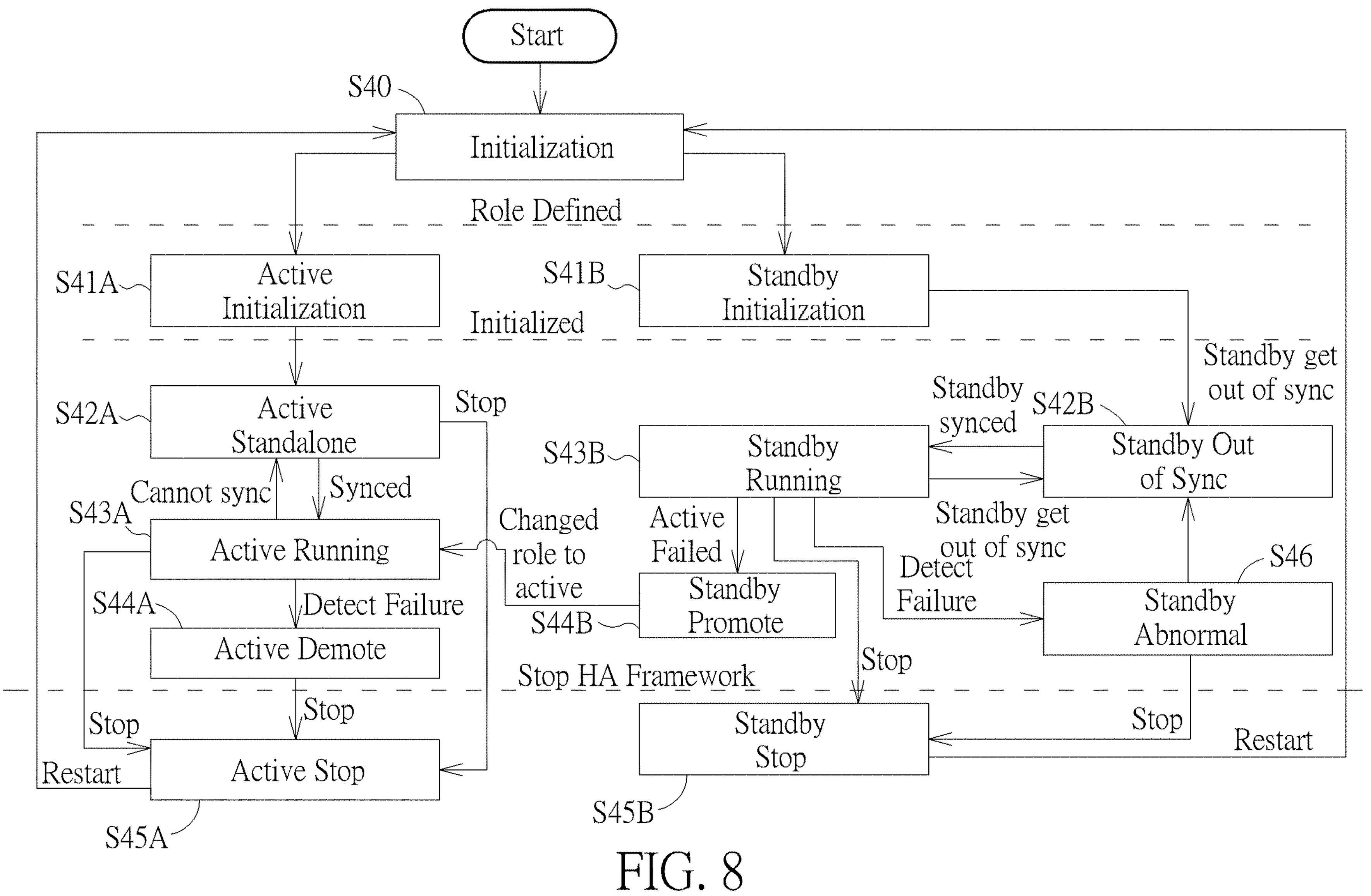
FIG. 8 illustrates a role and status transition control scheme of the method for performing high availability management of the AFA server according to an embodiment of the present invention.

FIG. 8 illustrates a role and status transition control scheme of the method for performing high availability management of the AFA server according to an embodiment of the present invention. Under control of the software layer (e.g. the software modules, such as the HA Framework module, etc.), the any node (e.g. each node) of the two nodes 100A and 100B can be configured to perform role and status transition control according to the role and status transition control scheme.

In Step S40, the node may perform initialization (e.g. the initialization of the system of the node).

In Step S41A, after the role of the node has been defined to be the active node, the node may perform active initialization (e.g. the initialization related to the role of the active node).

In Step S41B, after the role of the node has been defined to be the standby node, the node may perform standby initialization (e.g. the initialization related to the role of the standby node).

In Step S42A, after the node such as the active node has been initialized, the node may operate in the Standalone status of the role of the active node (labeled "Active Standalone" for brevity).

In Step S42B, after the node such as the standby node has been initialized, the node may operate in the Out of Sync status of the role of the standby node (labeled "Standby Out of Sync" for brevity), since the standby node may get out of synchronization with respect to the active node at this moment (labeled "Standby get out of sync" for brevity).

In Step S43A, when the node such as the active node has synchronized (synced) the latest data stored in the active node to the standby node, the node such as the active node may operate in the Running status of the role of the active node (labeled "Active Running" for brevity). For example, when the node such as the active node cannot synchronize (sync) the latest data stored in the active node to the standby node, Step S42A is entered.

In Step S43B, when the node such as the standby node has synchronized (synced) the latest data from the active node to make the data stored in the standby node be equivalent to the latest data stored in the active node, the node may operate in the Running status of the role of the standby node (labeled "Standby Running" for brevity). For example, when the standby node gets out of synchronization with respect to the active node (labeled "Standby get out of sync" for brevity), Step S42B is entered.

In Step S44A, when the node such as the active node detects failure thereof, the node may operate in the Demote status of the role of the active node (labeled "Active Demote" for brevity).

In Step S44B, when detecting that the active node failed (labeled "Active Failed" for brevity), the node such as the standby node may operate in the Promote status of the role of the standby node (labeled "Standby Promote" for brevity). As shown in FIG. 8, the arrow pointing toward Step S43A from Step S44B indicates that, when the node such as the standby node has changed the role thereof to the role of the active node (labeled "Changed role to active" for brevity), this node becomes the latest active node among the two nodes 100A and 100B.

In Step S45A, when the node such as the active node stops working (e.g. the node may stop the HA Framework module thereof), the node may enter the Stop status of the role of the active node (labeled "Active Stop" for brevity), where the node stops the service thereof. Afterward, the node may restart automatically.

In Step S45B, when the node such as the standby node stops working (e.g. the node may stop the HA Framework module thereof), the node may enter the Stop status of the role of the standby node (labeled "Standby Stop" for brevity), where the node stops the service thereof. Afterward, the node may restart automatically.

In Step S46, when the node such as the standby node detects failure thereof, the node may operate in the Abnormal status of the role of the standby node (labeled "Standby Abnormal" for brevity). For example, if the node such as the standby node stops working (e.g. the node may stop the HA Framework module thereof), Step S45B is entered; otherwise, Step S42B is entered.

According to some embodiments, the any node (e.g. each node) of the two nodes 100A and 100B can be configured to monitor the status of the node according to the working flow shown in FIG. 8, and more particularly, perform resource management on multiple types of resources of the node. For better comprehension, any component (e.g. software component) managed by the HA Framework module can be referred to as resource. Examples of an action being applied to the resource may include, but are not limited to: Start (e.g. enable), Stop (e.g. disable), Demote (e.g. make the resource become inactive; in particular, for the whole of the node, release or give up the role the active node), Promote (e.g. make the resource become active; in particular, for the whole of the node, change the role thereof from standby to active), C2F (e.g. perform the C2F operation), Set Standalone (e.g. set the node such as the active node to provide service to the user without synchronizing/copying the latest data stored in the active node to the standby node), and Cancel Standalone (e.g. set the node such as the active node to provide service to the user while synchronizing/copying the latest data stored in the active node to the standby node).

According to some embodiments, the multiple types of resources may comprise VIP, MGMT, SMIStor and HW Manager. The VIP stands for Virtual Internet Protocol (IP) address of the AFA server 100, where the client device of the user may access the AFA server 100 through the VIP, and the active node may convert the request at the VIP into the request at the real IP address of the active node. The MGMT stands for Management module, and may operate as the frontend for user management, where the MGMT may comprise the UI (e.g. the UI software/program module such as the Web UI module shown in FIG. 4, the Web server process of one of the nodes 100A and 100B shown in FIG. 3, etc.), the DB (e.g. the DB software/program module such as the Database module shown in FIG. 4, the Database process of one of the nodes 100A and 100B shown in FIG. 3, etc.), and the Middleware (e.g. the API Server module shown in FIG. 4, the API middleware process of one of the nodes 100A and 100B shown in FIG. 3, etc.), where the UI can be configured to interact with the user for the AFA server 100, for example with aid of interactive panels, windows, timing charts, etc., the DB can be configured to store and manage historical information of the AFA server 100, for example, with respect to various features of the AFA server 100, and the Middleware can be configured to manage various requests (e.g. requests from the client device, the user, etc.), but the present invention is not limited thereto. In addition, the SMIStor stands for SMI Storage module, and may operate as the backend for internal management such as volume management (e.g. establishing volume), snapshot management (e.g. creating snapshot), etc., where the SMIStor may comprise the AFA software/program module such as the Storage Control Module of one of the nodes 100A and 100B shown in FIG. 3. Additionally, the HW Manager stands for the aforementioned HW manager such as the HW Manager module, where the HW Manager can be arranged to manage hardware (e.g. various components in the hardware layer, such as the BMC, the register circuit, the sensors/detectors, etc. on the main circuit board of the node). For example, the node can utilize the HW Manager to obtain sensing/detecting results from the sensors/detectors to monitor one or more types of status in the node.

Figure 9:
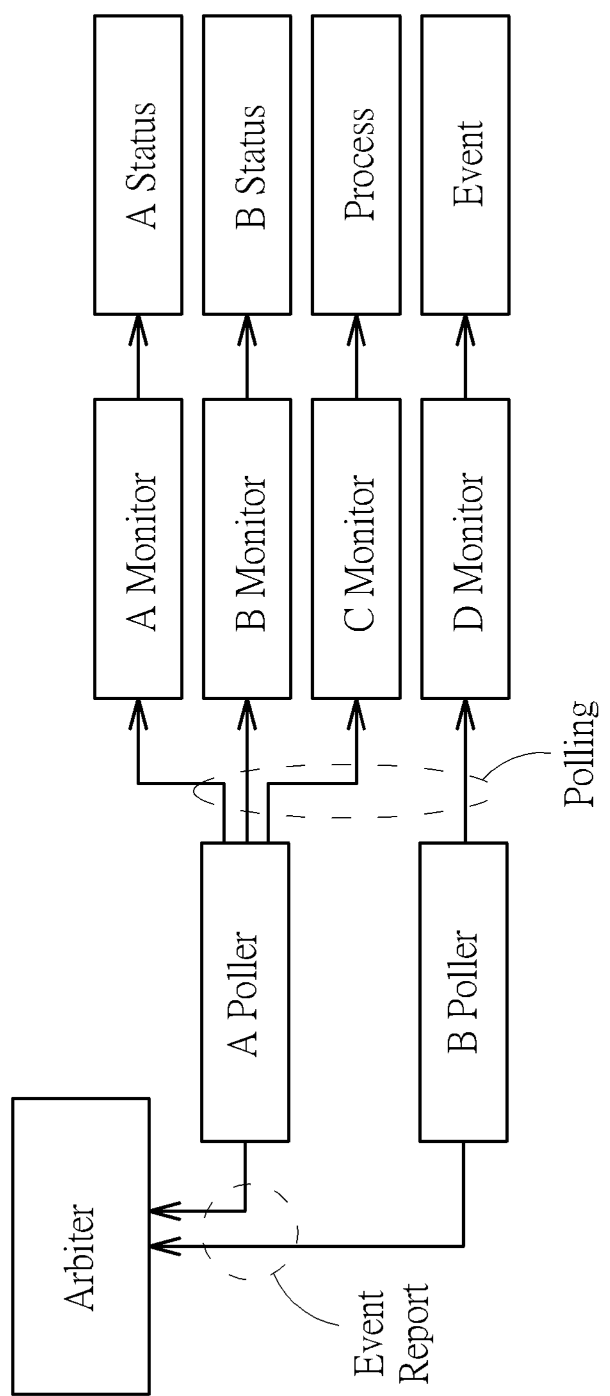
FIG. 9 illustrates a monitor and poller control scheme of the method for performing high availability management of the AFA server according to an embodiment of the present invention.
Figure 10:
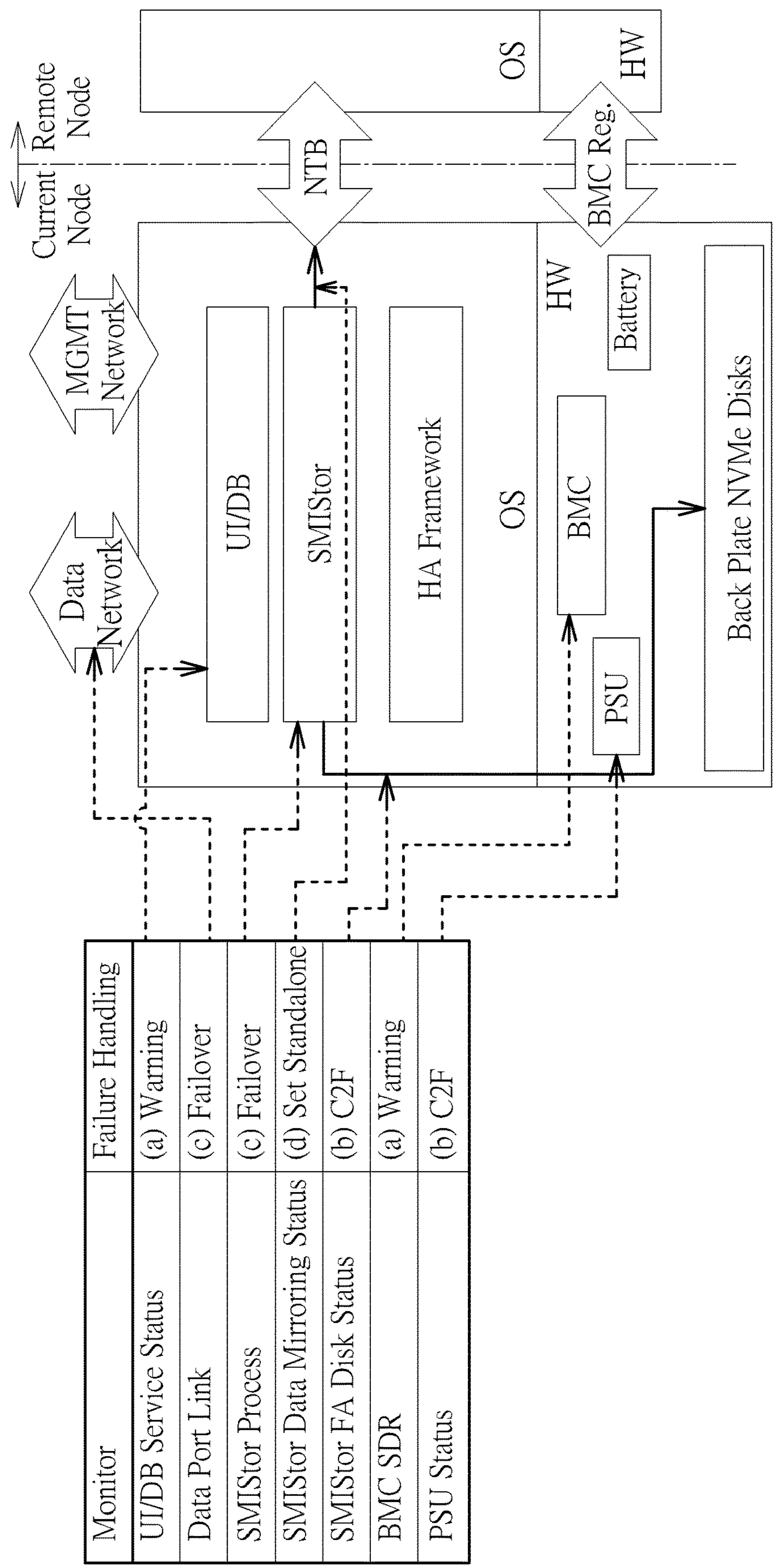
FIG. 10 illustrates some implementation details of the monitor and poller control scheme shown in FIG. 9.

FIG. 9 illustrates a monitor and poller control scheme of the method for performing high availability management of the AFA server according to an embodiment of the present invention, and FIG. 10 illustrates some implementation details of the monitor and poller control scheme shown in FIG. 9. Under control of the software layer (e.g. the software modules, such as the HA Framework module, etc.), the any node (e.g. each node) of the two nodes 100A and 100B can be configured to perform monitor and poller control according to the monitor and poller control scheme. As shown in FIG. 9, a monitor and poller module of the node comprises multiple sub-modules such as an arbiter, a set of pollers (e.g. A Poller, B Poller, etc.), and associated monitors (e.g. A Monitor, B Monitor, C Monitor, D Monitor, etc.) respectively corresponding to the set of pollers, where the monitor and poller module (e.g. the multiple sub-modules thereof) belongs to the program modules running on the processor of this node (e.g. the program modules 112A running on the processor 110A of the node 100A or the program modules 112B running on the processor 110B of the node 100B, depending on whether this node is the node 100A or the node 100B). The HA Framework module of the node can utilize the monitor and poller module among the program modules running on the node to monitor the multiple types of resources of the AFA server 100, wherein the multiple program modules running on the node comprise the hardware (HW) manager (e.g. the HW Manager module in one of the nodes 100A and 100B as shown in FIG. 7), and the hardware manager is configured to manage multiple hardware components in the hardware layer of the any node, to allow at least one portion of associated monitoring results (e.g. A Status, B Status Process, Event, etc.) regarding the multiple types of resources to be obtained through the hardware manager. In addition, the HA Framework module of the node can control the node to classify the monitored information into multiple monitored-information types to perform at least one operation of multiple candidate operations respectively corresponding to the multiple monitored-information types, wherein the monitored information may comprise the associated monitoring results regarding the multiple types of resources, and the at least one portion of the associated monitoring results regarding the multiple types of resources may comprise remote node information of a remote node, where the remote node may represent another node differing from the any node among the two nodes 100A and 100B. For example, the HA Framework module of the node may utilize the arbiter to determine the role and the status of the node according to the associated monitoring results (e.g. A Status, B Status Process, Event, etc.) regarding the multiple types of resources, utilize the monitors to perform monitoring on the multiple types of resources, and utilize set of pollers to perform polling on the monitors.

The architecture of the monitor and poller module as shown in FIG. 9 is for illustrative purposes only, and is not meant to be a limitation of the present invention. For example, for each resource of the multiple types of resources, one or more monitors are provided to monitor resource health of said each resource, and one or more pollers corresponding to the one or more monitors are provided to poll one or more monitoring results of the one or more monitors and to return one or more event reports corresponding to the one or more monitoring results to the arbiter. More particularly, each resource of the multiple types of resources may have been equipped with one or more monitors which are responsible for monitoring resource health of this resource, and may have been equipped with its own one or more pollers (e.g. the one or more pollers corresponding to the one or more monitors) for polling (e.g. querying, periodically or intermittently, depending on some requirements) one or more monitoring results of the one or more monitors and returning one or more event reports corresponding to the one or more monitoring results to the arbiter, and any poller of the set of pollers may be configured to poll at least one monitor of the monitors in the monitor and poller module, where the arbiter can be configured to determine the latest role and the latest status of the node (such as respective latest versions of the role and the status of the node) for the HA Framework module according the aforementioned associated monitoring results regarding the multiple types of resources, and more particularly, according to the associated monitoring results comprising the role and at least one state of the remote node (e.g. the other node within the two nodes 100A and 100B) and the one or more event reports, to make the HA Framework module control the node to perform at least one operation of associated candidate operations such as takeover, failover, C2F, split brain management, etc. efficiently, and therefore enhance the overall performance of the AFA server 100, but the present invention is not limited thereto. According to some embodiments, the HA Framework module may utilize a resource manager therein to manage (e.g. operate; in particular, start, stop, restart, etc.) the resources within the node, and utilize the Connector module of the node to communication with the remote node to get the status of the remote node.

As shown in FIG. 10, some arrows illustrated with dashed lines indicate that the aforementioned monitors of the node (e.g. the current node), such as at least one monitor for monitoring the UI/DB service status, at least one for monitoring the data port link, at least one for monitoring the SMIStor process, at least one for monitoring the SMIStor data mirroring status, at least one for monitoring the FA disk status, at least one for monitoring the BMC SDR, at least one for monitoring the PSU status, etc., can be configured to monitor the multiple types of resources such as the UI/DB, the data network, the SMIStor (e.g. the SMIStor process), at least one role information exchange path of the role information exchange paths corresponding to the NTB path (labeled "NTB" for brevity), at least one control path from the SMIStor to the corresponding SSD group (e.g. the SSD group 12A or the SSD group 12B) installed at the backplane circuit 100R such as a back plate (labeled "Back Plate NVMe Disks" for better comprehension), the BMC of, the PSU, etc. for the HA Framework module, respectively, and some examples regarding failure handling indicate that the HA Framework module can be configured to perform the associated failure handling operations such as Warning, Failover, Failover, Set Standalone, C2F, Warning, C2F, etc., respectively, where the monitored information may comprise the respective status information of the multiple types of resources, such as system information, status, event, etc. Examples of the components being monitored by the monitors may further comprise: BMC registers (labeled "BMC Reg." for brevity), such as the registers of the register circuits 1152A and 152B that are accessed through the BMCs 150A and 150B. Under control of the HA Framework module, the node can be configured to classify the monitored information into the multiple monitored-information types such as a first monitored-information type (e.g. Type A), a second monitored-information type (e.g. Type B), a third monitored-information type (e.g. Type C), a fourth monitored-information type (e.g. Type D), etc. to perform the at least one operation of the multiple candidate operations (e.g. the failure handling operations) respectively corresponding to the multiple monitored-information types. For example, the multiple candidate operations may comprise:

(a) output warning (labeled "Warning" for brevity);
(b) perform C2F operation (labeled "C2F" for brevity);
(c) trigger failover (labeled "Failover" for brevity); and
(d) set standalone (labeled "Set Standalone" for brevity);

where the multiple candidate operations respectively corresponding to the multiple monitored-information types (e.g. the candidate operations (a), (b), (c), (d), etc. respectively corresponding to Types A, B, C, D, etc.) are different from each other.

TABLE 2

| Monitor | Description | Failure Handling |
|---|---|---|
| (#1) Management Connection | Monitor 2 1G Ethernet status by query API server | (a) Warning |
| (#2) Data Connection Speed | Monitor four 10G Ethernet speed by query API server | (c) Failover |
| (#3) Web Server Process | Monitor web server service process exist or not by command "ps aux" | (a) Warning |
| (#4) API Server Process | Monitor API server service process exist or not by command "ps aux" | (a) Warning |
| (#5) Database Process | Monitor database process exist or not by command "ps aux" | (a) Warning |
| (#6) SMIStor Process | Monitor SMIStor process exist or not by command "ps aux" | (c) Failover |
| (#7) SMIStor Pmem Status | Monitor SMIStor persistent memory status by SMIStor RPC | (d) Set Standalone |
| (#8) SMIStor FA Disk SMART Info | Monitor NVMe SMART information by SMIStor RPC | (b) C2F |
| (#9) Node Present | Monitor if node is removed or not | (e) Further check |
| (#10) NTB Heartbeat | Query remote node state every 1 s by | (e) Further check |

TABLE 2-continued

| Monitor | Description | Failure Handling |
|---|---|---|
| | NTB memory mapping | |
| (#11) BMC Register | Query remote node state every 1 s by BMC register | (e) Further check |
| (#12) Disk Present | Monitor NVMe Disk exists or not | (b) C2F |
| (#13) BMC HW Info | Monitor HW information | (a) Warning |
| (#14) M.2 Status | Monitor M.2 Health | (c) Failover |
| (#15) Power Supply | Monitor Power Supply Status | (b) C2F |

Table 2 illustrates some examples of the aforementioned monitors of the node (e.g. the current node) and the corresponding failure handling operations, where the monitors #1, #2 . . . and #15 can be arranged to monitor associated resources as shown in the field "Description" of Table 2, respectively. For example, the monitor #1 can monitor the respective status of two 1G Ethernet circuits by querying the API server, where the two 1G Ethernet circuits can be taken as examples of the respective interface circuits of the two nodes 100A and 100B for establishing one of the aforementioned at least two communications paths between the two nodes 100A and 100B (e.g. the respective interface circuits of the BMCs 150A and 150B for establishing the BMC path, the respective interface circuits of the NTB communications circuits 140A and 140B for establishing the NTB path, etc.); the monitor #2 can monitor the respective speed of four 10G Ethernet circuits by querying the API server, where the four 10G Ethernet circuits can be taken as examples of the network interface circuits 132A and 134A and the network interface circuits 132B and 134B; the monitors #3, #4, #5 and #6 can monitor whether the Web server process, the API server process (e.g. the API middleware process), the Database process and the SMIStor process exist or not by the command "ps aux", respectively; the monitor #7 can monitor the SMIStor Pmem status (e.g. the status of the Pmem under control of the SMIStor) by the SMIStor RPC (e.g. the RPC module of the SMIStor); the monitor #8 can monitor the SMIStor FA Disk Self-Monitoring, Analysis and Reporting Technology (SMART) information (Info) such as the SMART information of the respective disk of the FA under control of the SMIStor; the monitor #9 can monitor if the node (e.g. the current node) is removed or not, where the corresponding failure handling operation may vary, and more particularly, may be one of some candidate handling operations such as Warning, C2F, Failover, Set Standalone, etc., depending on further check; the monitor #10 can monitor the NTB heartbeat (e.g. the heartbeat transmitted through the NTB path) to query the state of the remote node every one second (1 s) by NTB memory mapping, where the corresponding failure handling operation may vary, and more particularly, may be one of some candidate handling operations such as Warning, C2F, Failover, Set Standalone, etc., depending on further check; the monitor #11 can monitor the BMC Register (e.g. one or more registers of the register circuit of the remote node that are accessed through the BMCs 150A and 150B) to query the state of the remote node every one second (1 s), where the corresponding failure handling operation may vary, and more particularly, may be one of some candidate handling operations such as Warning, C2F, Failover, Set Standalone, etc., depending on further check; the monitor #12 can monitor the whether the disk (e.g. each SSD of the corresponding SSD group) such as the NVM Express (NVMe) Disk exists or not; the monitor #13 can monitor the BMC HW information (Info), for example, the HW information of some HW components that is obtained from the sensors/detectors through the BMC, where the total amount of the sensors/detectors may be quite large, and more particularly, may be greater than one hundred, for collecting various monitored information; the monitor #14 can monitor the C2F SSD such as the M.2 module, and more particularly, monitor the status (e.g. health) of the M.2 module; and the monitor #15 can monitor the aforementioned at least one main power source (e.g. the aforementioned at least one power supply) of the current node. Regarding a certain monitor of the monitors #9, #10 and #11, as two or more checking operations based on two or more monitors (e.g. this monitor and at least one other monitor) among the monitors #1, #2 . . . and #15 may be required to make sure a candidate operation being selected from the multiple candidate operations such as (a), (b), (c), (d), etc. is proper, this candidate operation may be correctly determined according to a combination of the two or more checking operations, and therefore is selected depending on further check. According to some viewpoints, the further check corresponding to the combination of the two or more checking operations may be regarded as a candidate operation (e) corresponding to another monitored-information type such as Type E.

For better comprehension, the aforementioned at least one monitor for monitoring the UI/DB service status as shown in FIG. 10 may comprise the monitors #3, #4 and #5 for respectively monitoring the Web server process, the API server process (e.g. the API middleware process) and the Database process as shown in Table 2, the aforementioned at least one monitor for monitoring the data port link may comprise the monitor #2 for monitoring the data connection speed as shown in Table 2, the aforementioned at least one for monitoring the SMIStor process may comprise the monitor #6 for monitoring the SMIStor process as shown in Table 2, the aforementioned at least one for monitoring the SMIStor data mirroring status may comprise the monitor #7 for monitoring the SMIStor Pmem status (e.g. the status of the Pmem under control of the SMIStor) as shown in Table 2, the aforementioned at least one for monitoring the FA disk status may comprise the monitors #8 and #12 for respectively monitoring the SMIStor FA Disk Self-Monitoring, Analysis and Reporting Technology (SMART) information (Info) and whether the disk is present as shown in Table 2, the aforementioned at least one for monitoring the BMC SDR may comprise the monitor #13 for monitoring the BMC HW Info (e.g. HW information obtained through the BMC) as shown in Table 2, and the aforementioned at least one for monitoring the PSU status may comprise the monitor #15 for monitoring the aforementioned at least one main power source such as the aforementioned at least one power supply as shown in Table 2.

According to some embodiments, the table contents of Table 2 may vary. For example, the monitor count of the monitors of Table 2 and/or the failure handling operation corresponding to any of the monitors of Table 2 may be changed when there is a need. For another example, the field "Description" of Table 2 may be omitted as long as implementation of the present invention will not be hindered. More particularly, as the respective meanings of the monitors #1, #2 . . . and #15 and the corresponding failure handling operations are clear, Table 2 may be further simplified.

TABLE 3

| Monitor | Failure Handling |
| --- | --- |
| (#1) | (a) |
| (#2) | (c) |
| (#3) | (a) |
| (#4) | (a) |
| (#5) | (a) |
| (#6) | (c) |
| (#7) | (d) |
| (#8) | (b) |
| (#9) | (e) |
| (#10) | (e) |
| (#11) | (e) |
| (#12) | (b) |
| (#13) | (a) |
| (#14) | (c) |
| (#15) | (b) |

Table 3 illustrates a simplified version of Table 2, but the present invention is not limited thereto. According to some embodiments, the table contents of Table 3 may vary. For example, the monitor count of the monitors of Table 3 and/or the failure handling operation corresponding to any of the monitors of Table 3 may be changed when there is a need.

Figure 11:
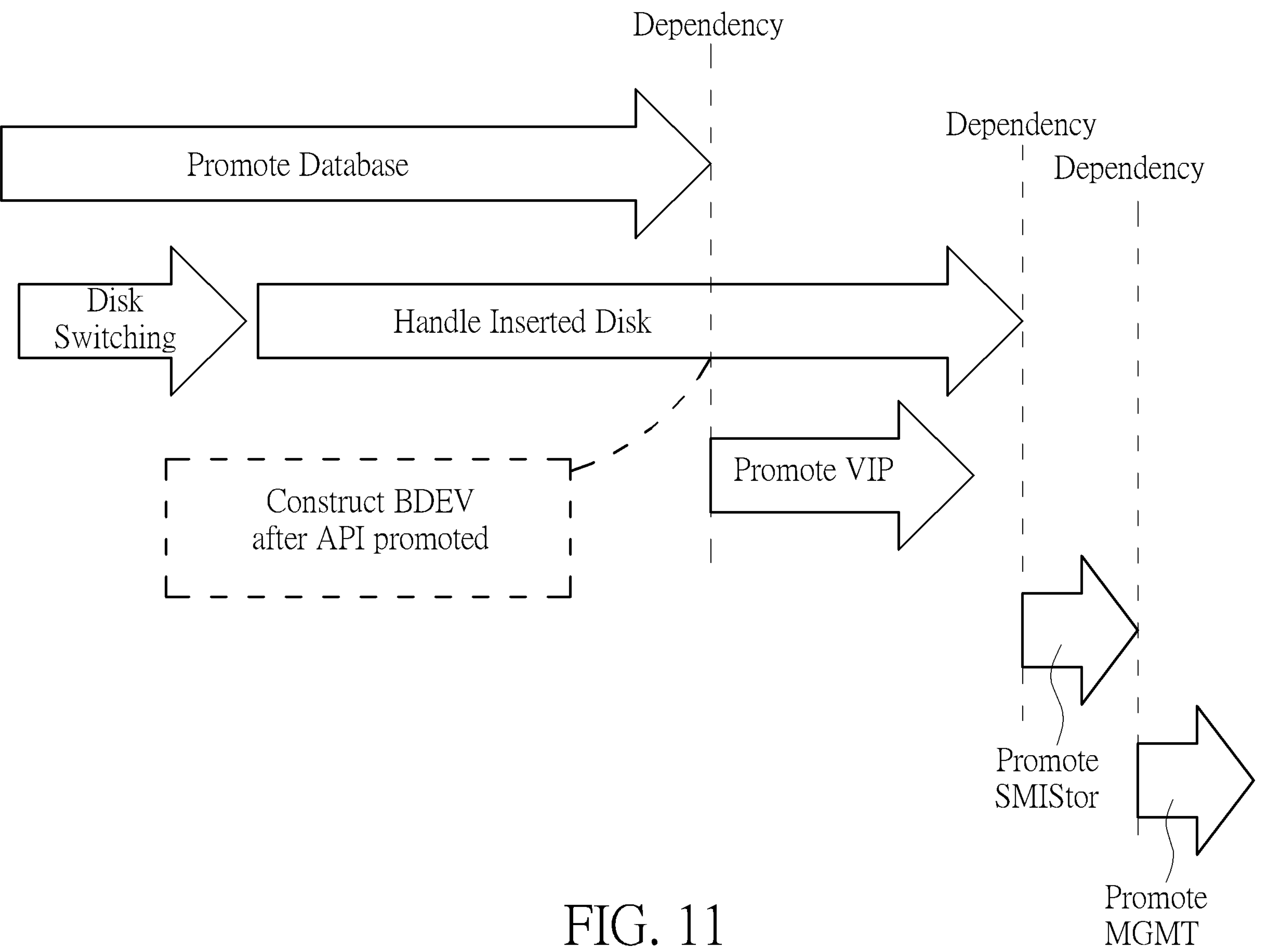
FIG. 11 illustrates a failover control scheme of the method for performing high availability management of the AFA server according to an embodiment of the present invention.

FIG. 11 illustrates a failover control scheme of the method for performing high availability management of the AFA server according to an embodiment of the present invention. Under control of the software layer (e.g. the software modules, such as the HA Framework module, etc.), the any node (e.g. each node) of the two nodes 100A and 100B can be configured to perform failover control according to the failover control scheme. For example, in Step S44B shown in FIG. 8, when the node is going to change the role thereof from standby (e.g. the role of the standby node) to active (e.g. the role of the active node), the node can promote the Database and perform disk switching to obtain the control over a target SSD group (e.g. the SSD group previous accessed by the other node among the two nodes 100A and 100B); if there is any inserted disk such as a new SSD, the node can start handling this inserted disk, where the new SSD may replace an old SSD (e.g. a damaged SSD) within the SSD group; after the completion of the operation of promoting the Database, the node can construct the block device (BDEV) after the API is promoted, and then promote the VIP, where any of the vertical lines may indicate the dependency between two subsequently executed operations; after the completion of the operation of handling the inserted disk (if it exists) and the completion of the operation of promoting the VIP, the node can promote the SMIStor; and after the completion of the operation of promoting the SMIStor, the node can promote the MGMT.

Some implementation details regarding the C2F operation may be further described as follows. According to some embodiment, when performing the C2F operation, the any node (e.g. each node) of the two nodes 100A and 100B can first clean the complete flag COMPLETE_FLAG, and more particularly, reset the complete flag COMPLETE_FLAG to be a default logic value (e.g. the logic value 0) indicating False, i.e. COMPLETE_FLAG=False; after cleaning the complete flag COMPLETE_FLAG, the node can block any input/output (I/O) operation from outside of the AFA server 100 (e.g. any access operation that the client device performed on the AFA server 100), for example, by turning off the network interface circuits 132A and 134A and the network interface circuits 132B and 134B, in order to prevent any error due to the I/O operation, where the node can keep blocking the any I/O operation until the node restart; after blocking the any I/O operation, the node can disable any iSCSI target; after disabling the any iSCSI target, the node can utilize the SMIStor to flush any data to be protected, such as the memory data (e.g. the data in the DRAM of the standby node), the register values in the registers of the register circuit, etc., into the one or more NVM storage devices (e.g. Flash memory) conforming to the M.2 specification (labeled "Flash (M.2)" in Table 1 for better comprehension); after utilizing the SMIStor to flush the any data to be protected, the node can stop the DB (e.g. the DB software/program module such as the Database module shown in FIG. 4, the Database process of one of the nodes 100A and 100B shown in FIG. 3, etc.); after stopping the DB, the node can set the complete flag COMPLETE_FLAG to be another logic value (e.g. the logic value 1) indicating True, i.e. COMPLETE_FLAG=True; and after setting the complete flag COMPLETE_FLAG to be said another logic value, the node can shut down the operating system (OS) running on the node. For example, when the node is going to enter any Stop status such as any of the Stop status of the role of the active node (labeled "Active Stop" in FIG. 8 for brevity) and the Stop status of the role of the standby node (labeled "Standby Stop" in FIG. 8 for brevity), the node can be configured to perform the C2F operation as described above. For brevity, similar descriptions for these embodiments are not repeated in detail here.

According to some embodiment, the any node (e.g. each node) of the two nodes 100A and 100B can perform recovery according to at least one recovery policy (e.g. one or more recovery policies). For example, in a situation where the node originally plays the role of the standby node, when failure of the active node occurs, the node such as the standby node can perform takeover to start providing service to the user, trigger power off of the active node, and replace the failure active node, where the node such as the standby node becomes the latest active node. For another example, in a situation where the node plays the role of the active node, when failure of the standby node occurs, the node such as the active node can trigger power off of the standby node, and change the active node status thereof (e.g. the status of the role of the active node) to be standalone, to allow replacement of the failure standby node. For yet another example, when C2F occurs (e.g. the two nodes 100A and 100B perform respective C2F operations when power failure of the AFA server 100 occurs), after completion of the respective C2F operations of the two nodes 100A and 100B, the AFA server 100 can stay in a power off state until it obtains normal power again, where the AFA server 100 can automatically restart the two nodes 100A and 100B at the same time when obtaining normal power. For brevity, similar descriptions for these embodiments are not repeated in detail here.

According to some embodiments, the table shown in the left half of FIG. 10, Table 2 and Table 3 may be regarded as Monitor-Failure Handling tables. For example, by classifying the monitors of the monitor and poller module in advance with aid of at least one Monitor-Failure Handling table (e.g. at least one of these three Monitor-Failure Handling tables), the any node (e.g. each node) of the two nodes 100A and 100B can classify the monitored information into the multiple monitored-information types correspondingly. For brevity, similar descriptions for these embodiments are not repeated in detail here.

Figure 12:
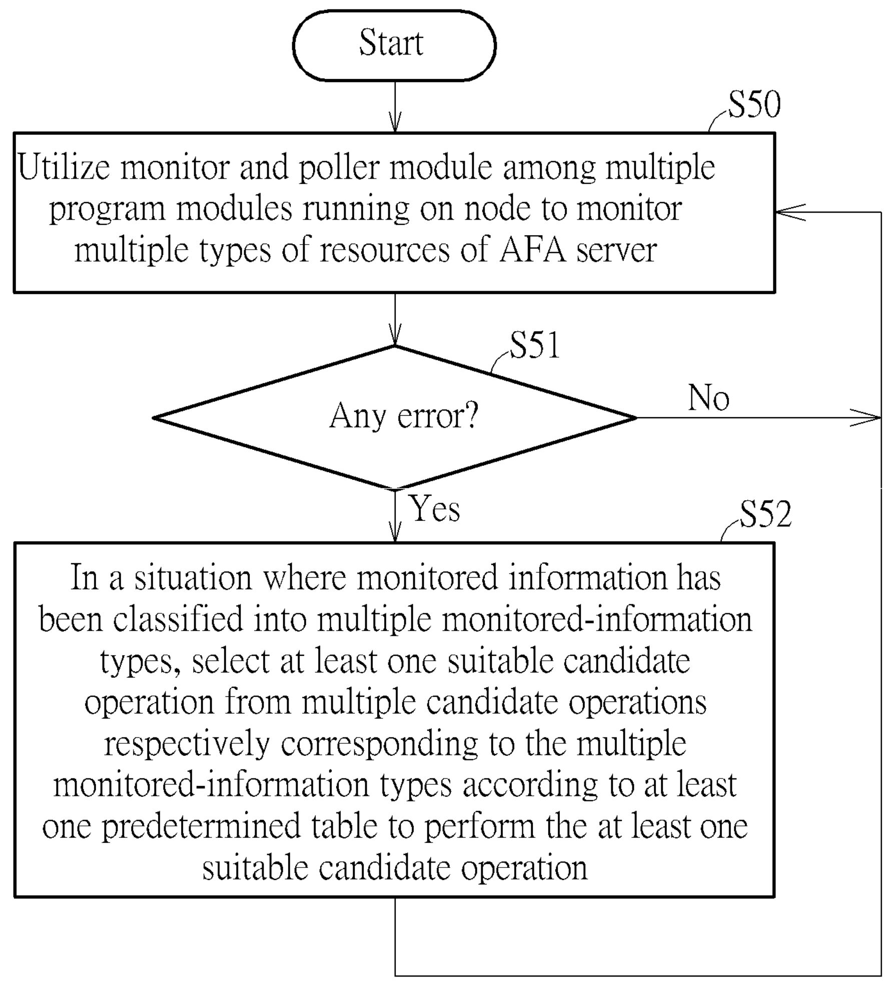
FIG. 12 is a flowchart of the method for performing high availability management of the AFA server according to an embodiment of the present invention.

FIG. 12 is a flowchart of the method for performing high availability management of the AFA server according to an embodiment of the present invention. For example, the any node (e.g. each node) of the two nodes 100A and 100B can operate according to the working flow shown in FIG. 12.

In Step S50, the node (e.g. the HA Framework module thereof) can utilize the monitor and poller module (e.g. the monitors thereof, such as the monitors of the table shown in the left half of FIG. 10 and the monitors #1, #2 . . . and #15 of any of Tables 2 and 3) among the multiple program modules running on the node to monitor the multiple types of resources of the AFA server 100.

In Step S51, the node (e.g. the HA Framework module thereof) can utilize the monitor and poller module to check whether any error (e.g. error/failure as identified by any of the monitors of the monitor and poller module) occurs according to the monitored information. If Yes, Step S52 is entered; if No, Step S50 is entered. The any error may represent an unhealthy state (e.g. abnormal state) detected by any monitor of the monitors of the monitor and poller module, such as the unhealthy state of the resource corresponding to the any monitor among various resources of the AFA server 100. Taking any of the monitors #1, #2 . . . and #15 of Table 2 as an example of the any monitor, the object being monitored as described in the field "Description" may indicate the resource corresponding to the any monitor.

In Step S52, in response to the occurrence of the any error mentioned in Step S51, in a situation where the monitored information has been classified into the multiple monitored-information types (e.g. the first, the second, the third, the fourth monitored-information types, etc. such as Types A, B, C, D, etc.), the node (e.g. the HA Framework module thereof) can select at least one suitable candidate operation from the multiple candidate operations (e.g. the failure handling operations) respectively corresponding to the multiple monitored-information types according to at least one predetermined table (e.g. the at least one Monitor-Failure Handling table) to perform the at least one suitable candidate operation. For example, for each of the monitors of any of the three Monitor-Failure Handling tables, as one of the multiple candidate operations such as (a), (b), (c), (d), etc. may be illustrated in the field "Failure Handling" to indicate the candidate operation corresponding to a certain monitored-information type (e.g. the candidate operation (a) corresponding to Type A, the candidate operation (b) corresponding to Type B, the candidate operation (c) corresponding to Type C, the candidate operation (d) corresponding to Type D, etc.), the monitor classification (e.g. the classification of the monitors) based on the any of the three Monitor-Failure Handling tables can make the monitored information be classified into the multiple monitored-information types correspondingly.

According to this embodiment, the node can perform one or more of the operations of Steps S50-S52 multiple times to dynamically determine the latest role and the latest status of the node, and select the suitable candidate operation from the multiple candidate operations (e.g. the failure handling operations) to perform the suitable candidate operation when there is a need. As a result, the node operating according to the method can achieve the optimal performance of the AFA server 100. For brevity, similar descriptions for this embodiment are not repeated in detail here.

For better comprehension, the method may be illustrated with the working flow shown in FIG. 12, but the present invention is not limited thereto. According to some embodiments, one or more steps may be added, deleted, or changed in the working flow shown in FIG. 12.

According to some embodiments, the remote node information of the remote node may comprise node information respectively obtained through the at least two communications paths between the any node and the remote node. For example, the multiple hardware components in the hardware layer of the any node may comprise the NTB communications circuit and the BMC, and the at least two communications paths may comprise the NTB path between the NTB communications circuit of the any node and the corresponding NTB communications circuit of the remote node (e.g. the NTB communications circuits 140A and 140B), and the BMC path between the BMC of the any node and the corresponding BMC of the remote node (e.g. the BMCs 150A and 150B). For brevity, similar descriptions for these embodiments are not repeated in detail here.

According to some embodiments, regarding the candidate operation (a) such as outputting the warning, the UI (e.g. the UI program module among the multiple program modules running on the any node) may be configured to output the warning. Regarding the candidate operation (b) such as performing the C2F operation, the one or more NVM storage devices of the any node may be configured to perform the C2F operation to save any information to be protected when power failure occurs, wherein the any information to be protected may comprise the buffered data temporarily stored in the DRAM of the any node, and comprise the node information temporarily stored in the register circuit of the any node. Regarding the candidate operation (c) such as triggering failover, the any node may be configured to stop providing any service, and the remote node may be configured to change from the role of the standby node to the role of the active node. Regarding the candidate operation (d) such as setting standalone, the any node may be configured to provide service to the user without synchronizing the latest data stored in the any node to the remote node. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing high availability management of an all flash array (AFA) server, the method comprising:

utilizing a monitor and poller module among multiple program modules running on any node of multiple nodes of the AFA server to monitor multiple types of resources of the AFA server, wherein the multiple program modules running on the any node comprise a hardware manager, and the hardware manager is configured to manage multiple hardware components in a hardware layer of the any node, to allow at least one portion of associated monitoring results regarding the multiple types of resources to be obtained through the hardware manager;

checking whether any error occurs according to monitored information, wherein the monitored information comprises said associated monitoring results regarding the multiple types of resources; and in response to occurrence of the any error, in a situation where the monitored information has been classified into multiple monitored-information types, controlling the any node to select at least one suitable candidate operation from multiple candidate operations respectively corresponding to the multiple monitored-information types according to at least one predetermined table to perform the at least one suitable candidate operation;

wherein the at least one portion of said associated monitoring results regarding the multiple types of resources comprises remote node information of a remote node, wherein the remote node represents another node differing from the any node among the multiple nodes.

2. The method of claim 1, wherein the monitor and poller module comprises multiple sub-modules, and the multiple sub-modules of the monitor and poller module comprise:

an arbiter, configured to determine a role and a status of the any node according to said associated monitoring results regarding the multiple types of resources;

multiple monitors, configured to perform monitoring on the multiple types of resources; and a set of pollers, configured to perform polling on the multiple monitors, wherein any poller of the set of pollers is configured to poll at least one monitor of the multiple monitors.

3. The method of claim 2, wherein for each resource of the multiple types of resources, one or more monitors are provided to monitor resource health of said each resource; and for said each resource, one or more pollers corresponding to the one or more monitors are provided to poll one or more monitoring results of the one or more monitors and to return one or more event reports corresponding to the one or more monitoring results to the arbiter.

4. The method of claim 3, wherein the arbiter is configured to determine a latest role and a latest status of the any node according to a role and at least one state of the remote node and the one or more event reports, to enhance overall performance of the AFA server, wherein the latest role and the latest status of the any node represent respective latest versions of said role and said status of the any node.

5. The method of claim 1, wherein the remote node information of the remote node comprises node information respectively obtained through at least two communications paths between the any node and the remote node.

6. The method of claim 5, wherein the multiple hardware components in the hardware layer of the any node comprise a Non-Transparent Bridge (NTB) communications circuit and a Board Management Controller (BMC); and the at least two communications paths comprise a NTB path between the NTB communications circuit of the any node and a corresponding NTB communications circuit of the remote node, and a BMC path between the BMC of the any node and a corresponding BMC of the remote node.

7. The method of claim 1, wherein the multiple monitored-information types comprise a first monitored-information type, a second monitored-information type, a third monitored-information type, a fourth monitored-information type; and the multiple candidate operations respectively corresponding to the multiple monitored-information types are different from each other.

8. The method of claim 7, wherein the multiple candidate operations respectively corresponding to the multiple monitored-information types comprise a candidate operation of triggering failover, wherein regarding triggering said failover, the any node is configured to stop providing any service, and the remote node is configured to change from a role of a standby node to a role of an active node.

9. The method of claim 8, wherein the multiple candidate operations respectively corresponding to the multiple monitored-information types further comprise outputting warning, performing a Copy-to-Flash (C2F) operation and setting standalone, wherein:

a User Interface (UI) program module among the multiple program modules running on the any node is configured to output said warning;

one or more non-volatile memory (NVM) storage devices comprising NVM are configured to perform the C2F operation to save any information to be protected when power failure occurs, wherein said any information to be protected comprises buffered data temporarily stored in a Dynamic Random Access Memory (DRAM) of the any node, and comprises node information temporarily stored in a register circuit of the any node; and regarding setting standalone, the any node is configured to provide service to a user without synchronizing latest data stored in the any node to the remote node.

10. An all flash array (AFA) server, comprising:

multiple nodes, wherein any node of the multiple nodes comprises:

at least one processor, arranged to control operations of the any node under control of multiple program modules; and multiple hardware components in a hardware layer of the any node; and a plurality of solid state drives (SSDs), comprising:

a first SSD group corresponding to the any node; and a second SSD group corresponding to a remote node, wherein the remote node represents another node differing from the any node among the multiple nodes;

wherein:

the any node utilizes a monitor and poller module among the multiple program modules running on the any node to monitor multiple types of resources of the AFA server, wherein the multiple program modules running on the any node comprise a hardware manager, and the hardware manager is configured to manage the multiple hardware components in the hardware layer of the any node, to allow at least one portion of associated monitoring results regarding the multiple types of resources to be obtained through the hardware manager;

the any node checks whether any error occurs according to monitored information, wherein the monitored information comprises said associated monitoring results regarding the multiple types of resources; and in response to occurrence of the any error, in a situation where the monitored information has been classified into multiple monitored-information types, the any node selects at least one suitable candidate operation from multiple candidate operations respectively corresponding to the multiple monitored-information types according to at least one predetermined table to perform the at least one suitable candidate operation;

wherein the at least one portion of said associated monitoring results regarding the multiple types of resources comprises remote node information of the remote node.

11. The AFA server of claim 10, wherein the monitor and poller module comprises multiple sub-modules, and the multiple sub-modules of the monitor and poller module comprise:

an arbiter, configured to determine a role and a status of the any node according to said associated monitoring results regarding the multiple types of resources;

multiple monitors, configured to perform monitoring on the multiple types of resources; and a set of pollers, configured to perform polling on the multiple monitors, wherein any poller of the set of pollers is configured to poll at least one monitor of the multiple monitors.

* * * * *